US012643369B2

(12) United States Patent
Kim et al.

(10) Patent No.: US 12,643,369 B2
(45) Date of Patent: Jun. 2, 2026

(54) INTEGRATED THERMAL MANAGEMENT SYSTEM

(71) Applicants: Hyundai Motor Company, Seoul (KR); Kia Corporation, Seoul (KR)

(72) Inventors: Ki Mok Kim, Busan (KR); Sang Shin Lee, Suwon-si (KR); Man Ju Oh, Yongin-si (KR); Hyo Chan Bae, Hwaseong-si (KR); Hyeon Keun Yun, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 528 days.

(21) Appl. No.: 18/158,322

(22) Filed: Jan. 23, 2023

(65) Prior Publication Data

US 2024/0034123 A1 Feb. 1, 2024

(30) Foreign Application Priority Data

Aug. 1, 2022 (KR) ........................ 10-2022-0095519

(51) Int. Cl.
*B60H 1/00* (2006.01)

(52) U.S. Cl.
CPC ..... *B60H 1/00899* (2013.01); *B60H 1/00278* (2013.01); *B60H 1/00392* (2013.01)

(58) Field of Classification Search
CPC ........... B60H 1/00899; B60H 1/00278; B60H 1/00362
See application file for complete search history.

(56) References Cited

U.S. PATENT DOCUMENTS

2020/0391570 A1* 12/2020 Lee .................... B60H 1/32284
2021/0129627 A1* 5/2021 Kim ................... B60H 1/00899
2021/0146749 A1* 5/2021 Lee .................... B60H 1/00885

FOREIGN PATENT DOCUMENTS

KR 20200038608 A 4/2020
KR 20210053592 A * 5/2021 ......... B60H 1/32284
KR 20210061478 A * 5/2021 ............. B60H 1/143

OTHER PUBLICATIONS

Lee, Integrated thermal management system for vehicle, 2019, Full Document (Year: 2019).*
Kim, Heat Pump System for Vehicle, 2019, Full Document (Year: 2019).*

* cited by examiner

*Primary Examiner* — Nael N Babaa
(74) *Attorney, Agent, or Firm* — Slater Matsil, LLP

(57) ABSTRACT

An embodiment integrated thermal management system includes a first refrigerant line configured to allow a refrigerant to flow therethrough and including a compressor, an interior heat exchanger, a first expander, an exterior heat exchanger, a second expander, and an evaporator, a second refrigerant line including an integrated heat exchanger, a third refrigerant line, an expansion module configured to allow the refrigerant having passed through the first refrigerant line to flow to the integrated heat exchanger or to flow through the third refrigerant line, a first coolant line connected to the integrated heat exchanger, the first coolant line including a first water pump, a PE component, a first radiator, and a first valve, and a second coolant line connected to the integrated heat exchanger, the second coolant line including a second water pump, a battery, a second radiator, and a second valve.

15 Claims, 14 Drawing Sheets

INTEGRATED THERMAL MANAGEMENT SYSTEM

CROSS-REFERENCE TO RELATED APPLICATIONS

This application claims the benefit of Korean Patent Application No. 10-2022-0095519, filed on Aug. 1, 2022, which application is hereby incorporated herein by reference.

TECHNICAL FIELD

The present invention relates to an integrated thermal management system.

BACKGROUND

Recently, electric vehicles have been considered as necessary means for implementing environmentally friendly technologies and solving social issues such as energy depletion. The electric vehicle operates using a motor that outputs power by being supplied with electricity from a battery. Because the electric vehicle emits no carbon dioxide, generates very low noise, and uses the motor with energy efficiency higher than energy efficiency of an engine, the electric vehicle is in the limelight as an environmentally friendly vehicle.

A key technology for implementing the electric vehicle is related to a battery module. Recently, studies have been actively conducted on a reduction in weight of a battery, a reduction in size of the battery, and a reduction in time taken to charge the battery. The battery module needs to be used in an optimal temperature environment to maintain an optimal performance and a long lifespan. However, the battery module is difficult to use in the optimal temperature environment because of a change in outside temperature and heat generated while the battery module operates.

In addition, because the electric vehicle emits no waste heat, which is generated during combustion in a separate internal combustion engine, the electric vehicle uses an electric heating device to heat the interior in the winter season. Further, because the electric vehicle needs to be warmed up, under a cold weather condition, to improve the performance of charging and discharging the battery, the electric vehicle uses a separate electric heater that heats a coolant. That is, there is a technology that uses a cooling/heating system for adjusting a temperature of the battery module to maintain the optimal temperature environment for the battery module separately from a cooling/heating system for air conditioning of the interior.

In this case, an air conditioning system for conditioning air in an interior minimizes energy consumption by adopting a heat pump technology for minimizing heating energy consumption to increase a traveling distance.

Therefore, in the related art, electrical components, batteries, and integrated chillers are applied, but a refrigerant always circulates through the integrated chiller to implement the heat pump. Therefore, even when the temperature of the battery is raised, the refrigerant flows through the integrated chiller and absorbs heat of a coolant that exchanges heat with the battery, which causes a problem in that performance in raising the temperature of the battery deteriorates. In addition, in the related art, only a positive temperature coefficient (PTC) heater is used to heat conditioning air to heat the interior without using the heat pump, which causes a problem of excessive energy consumption.

The foregoing explained as the background is intended merely to aid in the understanding of the background of embodiments of the present invention, and is not intended to mean that the present invention falls within the purview of the related art that is already known to those skilled in the art.

SUMMARY

The present invention relates to an integrated thermal management system. Particular embodiments relate to an integrated thermal management system, in which a single integrated heat exchanger implements a process of cooling a power electric (PE) component and a battery and implements a heat pump, which makes it possible to make an entire circuit compact and implement the heat pump by improving a refrigerant circuit even during a process of raising a temperature of the battery.

Embodiments of the present invention can solve problems in the art and provide an integrated thermal management system, in which a single integrated heat exchanger implements a process of cooling a PE component and a battery and implements a heat pump by means of heat exchange with a refrigerant, which makes it possible to make an entire circuit compact and implement the heat pump by improving a refrigerant circuit even during a process of raising a temperature of the battery.

Embodiments of the present invention provide an integrated thermal management system including a first refrigerant line configured to allow a refrigerant to flow therethrough and including a compressor, an interior heat exchanger, a first expander, an exterior heat exchanger, a second expander, and an evaporator, a second refrigerant line including an integrated heat exchanger and branching off from a rear end of the exterior heat exchanger of the first refrigerant line, the second refrigerant line being connected to a front end of the compressor, a third refrigerant line branching off from a front end of the integrated heat exchanger of the second refrigerant line and connected to the front end of the compressor, an expansion module provided at a branch point between the second refrigerant line and the third refrigerant line and configured to allow the refrigerant having passed through the first refrigerant line to flow to the integrated heat exchanger or to flow through the third refrigerant line, the expansion module being configured to selectively expand the refrigerant flowing to the integrated heat exchanger, a first coolant line configured to allow a coolant to flow therethrough and connected to the integrated heat exchanger so that the coolant exchanges heat with the refrigerant, the first coolant line including a first water pump, a PE component, a first radiator, and a first valve, and a second coolant line configured to allow the coolant to flow therethrough and connected to the integrated heat exchanger so that the coolant exchanges heat with the refrigerant, the second coolant line including a second water pump, a battery, a second radiator, and a second valve.

The expansion module may include a first port configured to selectively communicate with the first refrigerant line, a second port configured to selectively communicate with the integrated heat exchanger, and a third port configured to selectively communicate with the third refrigerant line, and a third expander may be integrated with the expansion module to selectively expand the refrigerant flowing from the first port to the second port.

The expansion module may include a switching valve including a first port configured to selectively communicate with the first refrigerant line, a second port configured to selectively communicate with the integrated heat exchanger, and a third port configured to selectively communicate with the third refrigerant line, and a third expander spaced apart from the switching valve and provided at the front end of the integrated heat exchanger.

The first valve may be configured to circulate the coolant, which has circulated through the first water pump and the PE component, selectively to the first radiator or to the integrated heat exchanger, and the second valve may be configured to circulate the coolant, which has circulated through the second water pump and the battery, selectively to the second radiator or to the integrated heat exchanger.

In an air conditioning housing in which the interior heat exchanger and the evaporator are provided, a temperature adjustment door may be disposed between the evaporator and the interior heat exchanger and may adjust a temperature of conditioning air, and a heater device may be disposed rearward of the interior heat exchanger and may supplement a heat source during an operation.

The integrated thermal management system may further include a controller configured to control the compressor, the water pump, the expander, the valve, the expansion module, the temperature adjustment door, and the heater device based on an air conditioning mode and a thermal management mode.

The second coolant line may further include a coolant heater, and the controller may control and operate the coolant heater at the time of raising a temperature of the battery.

At the time of cooling an interior, the controller may open the first expander, allow the second expander to perform an expansion operation, control the expansion module to block a flow of the refrigerant to the second refrigerant line, and control the temperature adjustment door so that the conditioning air does not pass through the interior heat exchanger.

At the time of cooling the PE component by using outside air during the process of cooling the interior, the controller may operate the first water pump and control the first valve to circulate the coolant through the first radiator, and at the time of cooling the battery by using outside air during the process of cooling the interior, the controller may operate the second water pump and control the second valve to circulate the coolant through the second radiator.

At the time of cooling the PE component by using the integrated heat exchanger during a process of cooling an interior, the controller may open the first expander, allow the second expander to perform an expansion operation, allow the expansion module to expand the refrigerant while allowing the refrigerant to flow to the integrated heat exchanger, operate the first water pump, and control the first valve to circulate the coolant through the integrated heat exchanger.

At the time of cooling the battery by using the integrated heat exchanger during the process of cooling the interior, the controller may open the first expander, allow the second expander to perform the expansion operation, allow the expansion module to expand the refrigerant while allowing the refrigerant to flow to the integrated heat exchanger, operate the second water pump, and control the second valve to circulate the coolant through the integrated heat exchanger.

At the time of heating an interior, the controller may allow the first expander to perform an expansion operation, close the second expander, control the expansion module to allow the refrigerant to flow to the third refrigerant line, and control the temperature adjustment door so that the conditioning air passes through the interior heat exchanger.

At the time of heating an interior and cooling the PE component, the controller may open the first expander, close the second expander, control the expansion module to expand the refrigerant while allowing the refrigerant to flow to the integrated heat exchanger, operate the first water pump, and control the first valve so that the coolant flows to the integrated heat exchanger.

At the time of heating an interior and cooling the battery, the controller may open the first expander, close the second expander, control the expansion module to expand the refrigerant while allowing the refrigerant to flow to the integrated heat exchanger, operate the second water pump, and control the second valve so that the coolant flows to the integrated heat exchanger.

At the time of absorbing heat from outside air, cooling the PE component, or cooling the battery during a process of heating an interior, the controller may allow the first expander to perform an expansion operation, close the second expander, and control the expansion module so that the refrigerant flows to the integrated heat exchanger and is not expanded. At the time of cooling the PE component, the controller may operate the first water pump and control the first valve to allow the coolant to flow to the integrated heat exchanger, and at the time of cooling the battery, the controller may operate the second water pump and control the second valve to allow the coolant to flow to the integrated heat exchanger.

At the time of raising a temperature of the battery, the controller may control the expansion module to allow the refrigerant to flow to the third refrigerant line and may control and operate the second water pump and the coolant heater.

At the time of cooling the PE component or cooling the battery during a process of heating and dehumidifying an interior, the controller may open the first expander, allow the second expander to perform an expansion operation, and control the expansion module so that the refrigerant flows to the integrated heat exchanger and is expanded. At the time of cooling the PE component, the controller may operate the first water pump and control the first valve to allow the coolant to flow to the integrated heat exchanger, and at the time of cooling the battery, the controller may operate the second water pump and control the second valve to allow the coolant to flow to the integrated heat exchanger.

At the time of absorbing heat from outside air by the refrigerant during a process of heating and dehumidifying an interior, the controller may allow the first expander to perform an expansion operation, open the second expander, control the expansion module to block a flow of the refrigerant to the second refrigerant line, and control the temperature adjustment door so that the conditioning air passes through the interior heat exchanger.

At the time of cooling the PE component or cooling the battery during the process of absorbing heat from the outside air by the refrigerant and heating and dehumidifying the interior, the controller may control the expansion module so that the refrigerant flows to the integrated heat exchanger, and the refrigerant is not expanded. At the time of cooling the PE component, the controller may operate the first water pump and control the first valve to allow the coolant to flow to the integrated heat exchanger, and at the time of cooling the battery, the controller may operate the second water pump and control the second valve to allow the coolant to flow to the integrated heat exchanger.

According to the integrated thermal management system structured as described above, the single integrated heat exchanger implements the process of cooling the PE component and the battery and implements the heat pump by means of the heat exchange with the refrigerant, which makes it possible to make the entire circuit compact and implement the heat pump by improving the refrigerant circuit even during the process of raising the temperature of the battery. As described above, the heat pump may be implemented at the time of raising the temperature of the battery, which improves the energy efficiency in heating the interior.

In addition, based on various types of thermal management modes, the process of cooling the electrical components and the battery and the process of heating the interior by using the waste heat of the electrical components and the battery are performed by means of the heat exchange between the coolants circulating through the respective coolant lines and the refrigerant circulating through the refrigerant line, such that the thermal management efficiency is improved, which makes it possible to ensure the traveling distance of the motorized mobility.

BRIEF DESCRIPTION OF THE DRAWINGS

FIG. 10 is a view illustrating that the integrated thermal management system according to an embodiment of the present invention absorbs heat of outside air, cools the PE component, and cools the battery while heating the interior.

FIG. 11 is a view illustrating that the integrated thermal management system according to an embodiment of the present invention raises a temperature of the battery while heating the interior.

FIG. 12 is a view illustrating that the integrated thermal management system according to an embodiment of the present invention cools the PE component or cools the battery while heating and dehumidifying the interior.

FIG. 13 is a view illustrating that a refrigerant absorbs heat of the outside air while the integrated thermal management system according to an embodiment of the present invention heats and dehumidifies the interior.

FIG. 14 is a view illustrating that the integrated thermal management system according to an embodiment of the present invention cools the PE component or cools the battery while heating and dehumidifying the interior while the refrigerant absorbs heat of outside air.

DETAILED DESCRIPTION OF ILLUSTRATIVE EMBODIMENTS

Figure 1:
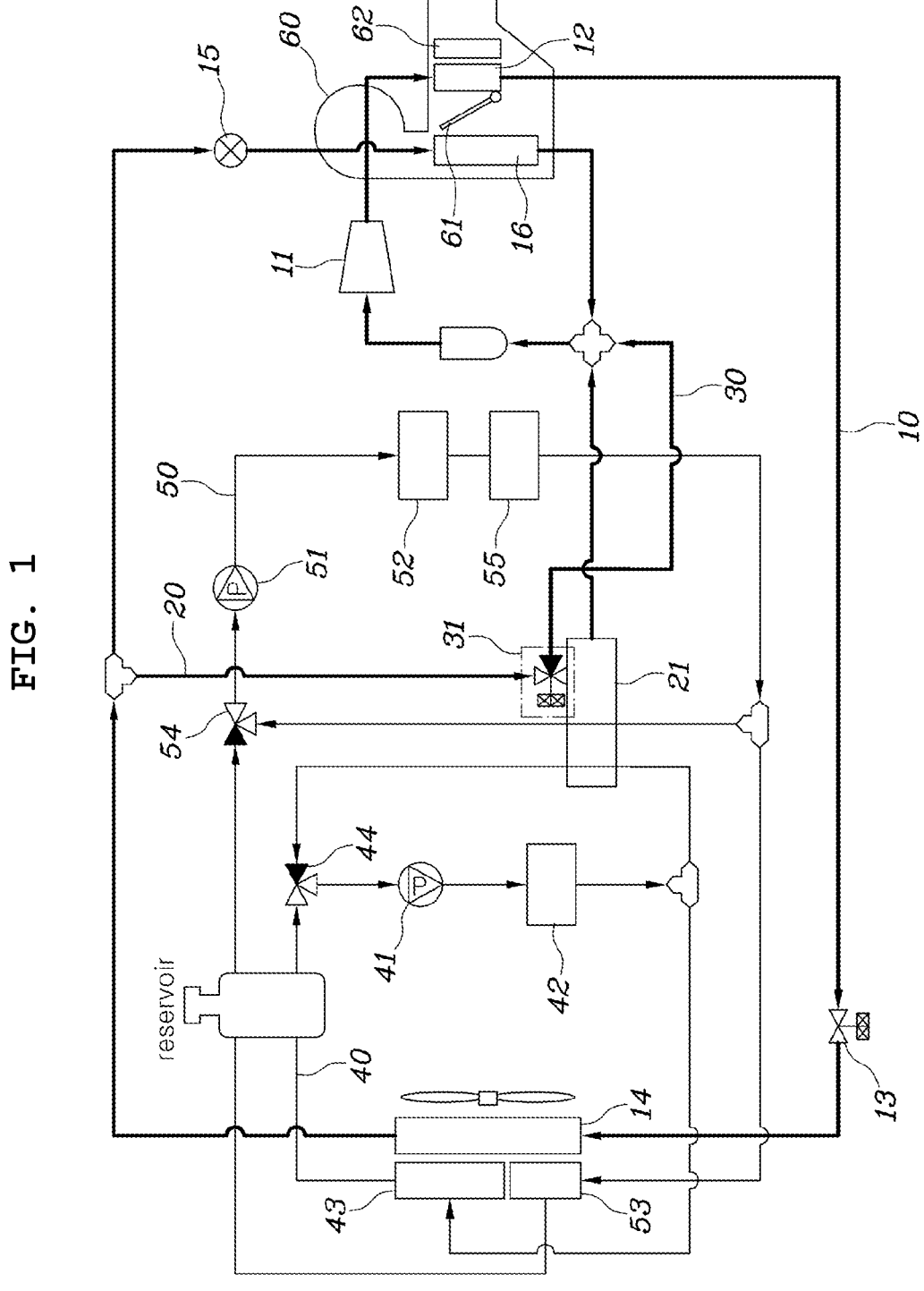
FIG. 1 is a view illustrating an integrated thermal management system according to an embodiment of the present invention.

Hereinafter, embodiments disclosed in the present specification will be described in detail with reference to the accompanying drawings. The same or similar constituent elements are assigned with the same reference numerals, and the repetitive description thereof will be omitted.

The suffixes 'module', 'unit', 'part', and 'portion' used to describe constituent elements in the following description are used together or interchangeably in order to facilitate the description, but the suffixes themselves do not have distinguishable meanings or functions.

In the description of the exemplary embodiments disclosed in the present specification, the specific descriptions of publicly known related technologies will be omitted when it is determined that the specific descriptions may obscure the subject matter of the exemplary embodiments disclosed in the present specification. In addition, it should be understood that the accompanying drawings are provided only to allow those skilled in the art to easily understand the exemplary embodiments disclosed in the present specification, and the technical spirit disclosed in the present specification is not limited by the accompanying drawings, and includes all alterations, equivalents, and alternatives that are included in the spirit and the technical scope of the present invention.

The terms including ordinal numbers such as "first," "second," and the like may be used to describe various constituent elements, but the constituent elements are not limited by the terms. These terms are used only to distinguish one constituent element from another constituent element.

When one constituent element is described as being "coupled" or "connected" to another constituent element, it should be understood that one constituent element can be coupled or connected directly to another constituent element, and an intervening constituent element can also be present between the constituent elements. When one constituent element is described as being "coupled directly to" or "connected directly to" another constituent element, it should be understood that no intervening constituent element is present between the constituent elements.

Singular expressions include plural expressions unless clearly described as different meanings in the context.

In the present specification, it should be understood that the terms "comprises," "comprising," "includes," "including," "containing," "has," "having" or other variations thereof are inclusive and therefore specify the presence of stated features, integers, steps, operations, elements, components, or combinations thereof, but do not preclude the presence or addition of one or more other features, integers, steps, operations, elements, components, or combinations thereof.

A control unit (controller) may include a communication device configured to communicate with another control unit or a sensor to control a corresponding function, a memory configured to store an operating system, a logic command, and input/output information, and one or more processors configured to perform determination, computation, decision, or the like required to control the corresponding function.

Figure 2:
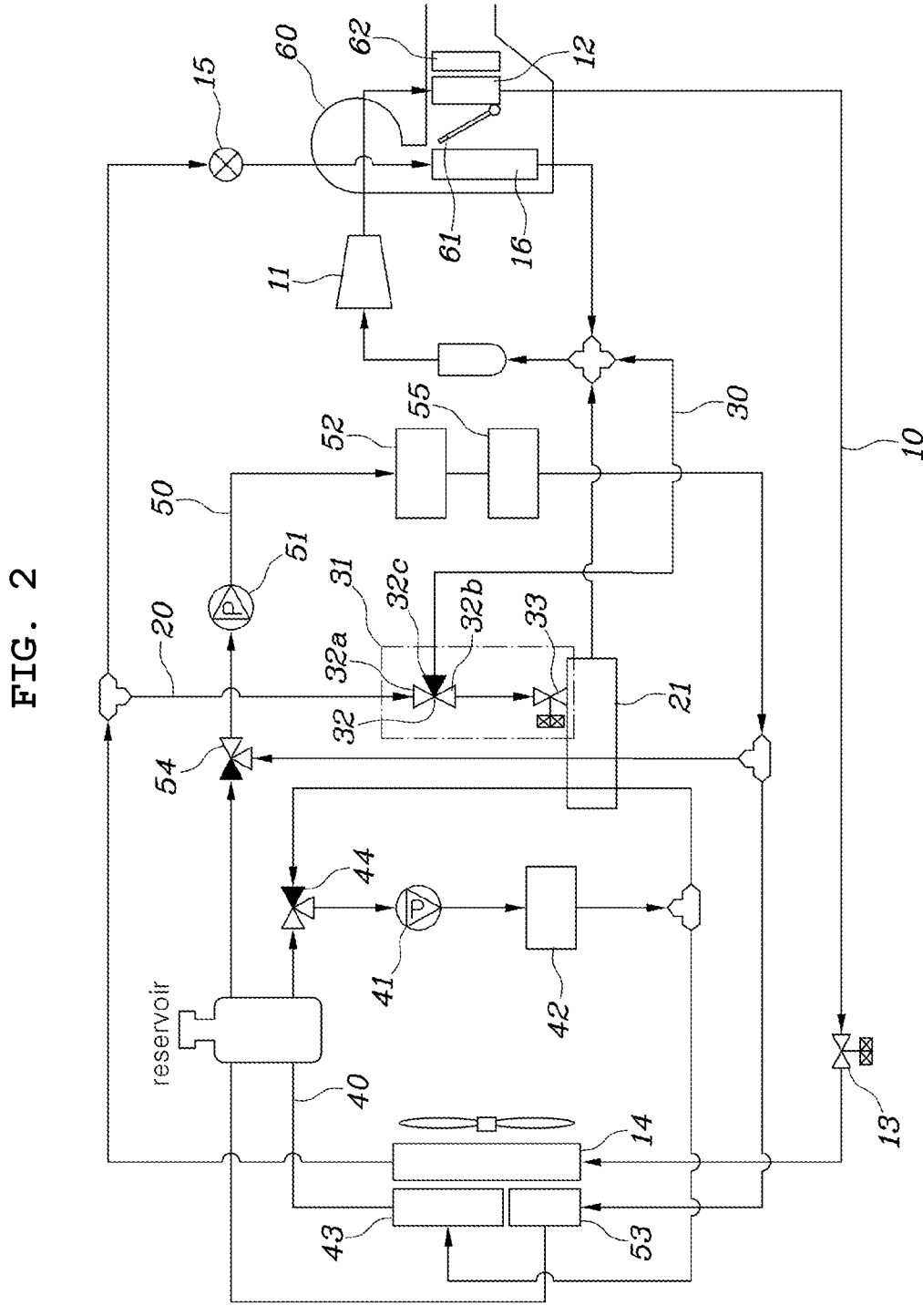
FIG. 2 is a view illustrating an integrated thermal management system according to another embodiment of the present invention.
Figure 3:
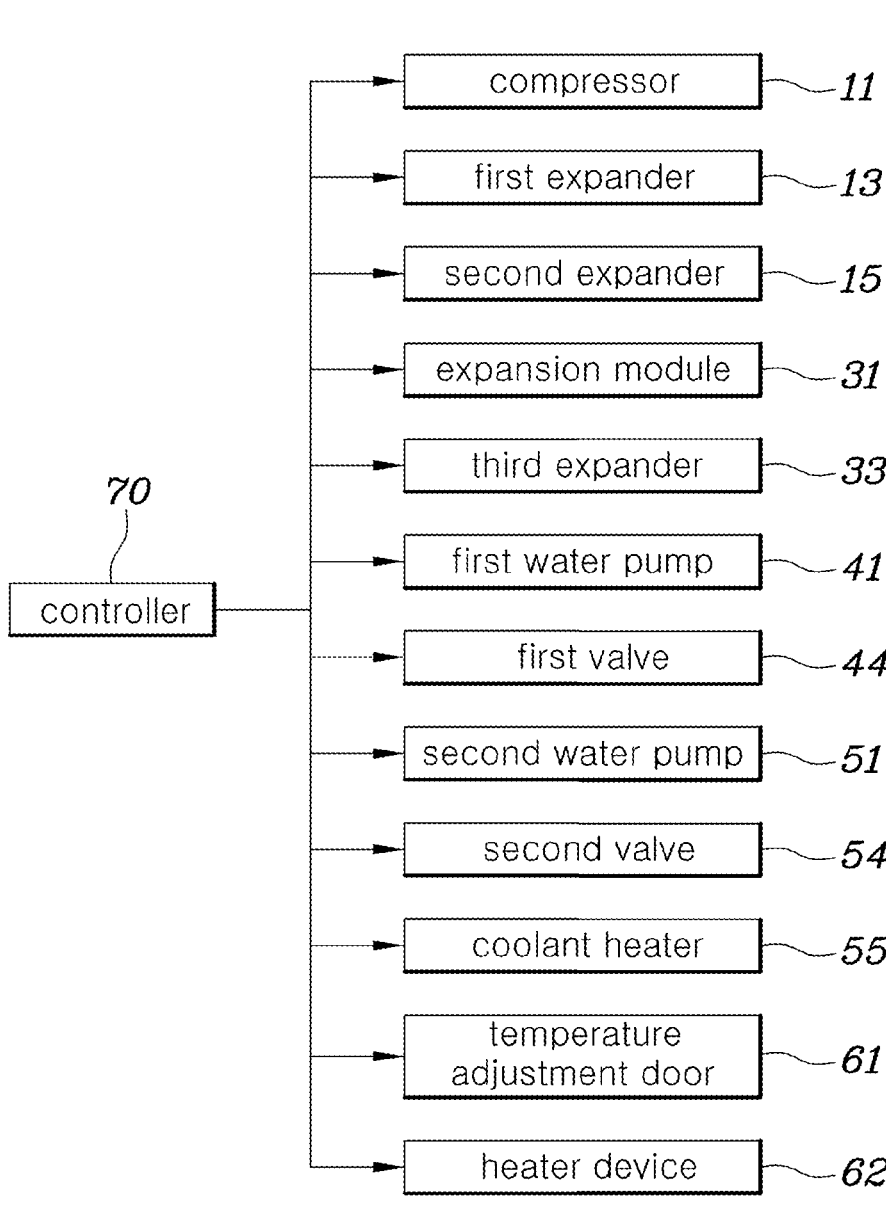
FIG. 3 is a configuration view of an integrated thermal management system according to an embodiment of the present invention.

FIG. 1 is a view illustrating an integrated thermal management system according to an embodiment of the present invention, FIG. 2 is a view illustrating an integrated thermal management system according to another embodiment of the present invention, and FIG. 3 is a configuration view of an integrated thermal management system according to an embodiment of the present invention.

Figure 4:
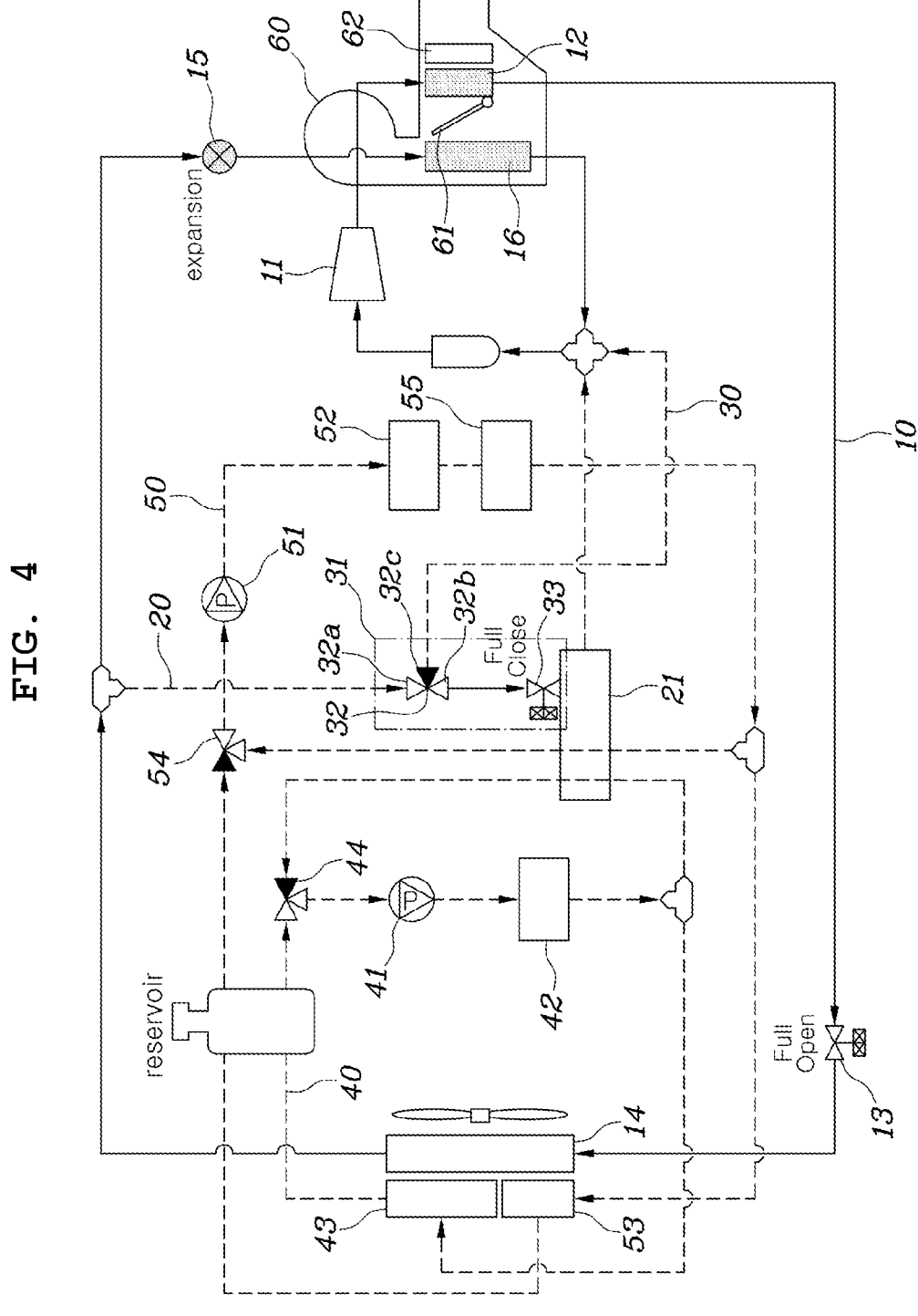
FIG. 4 is a view illustrating that the integrated thermal management system according to an embodiment of the present invention cools an interior.
Figure 5:
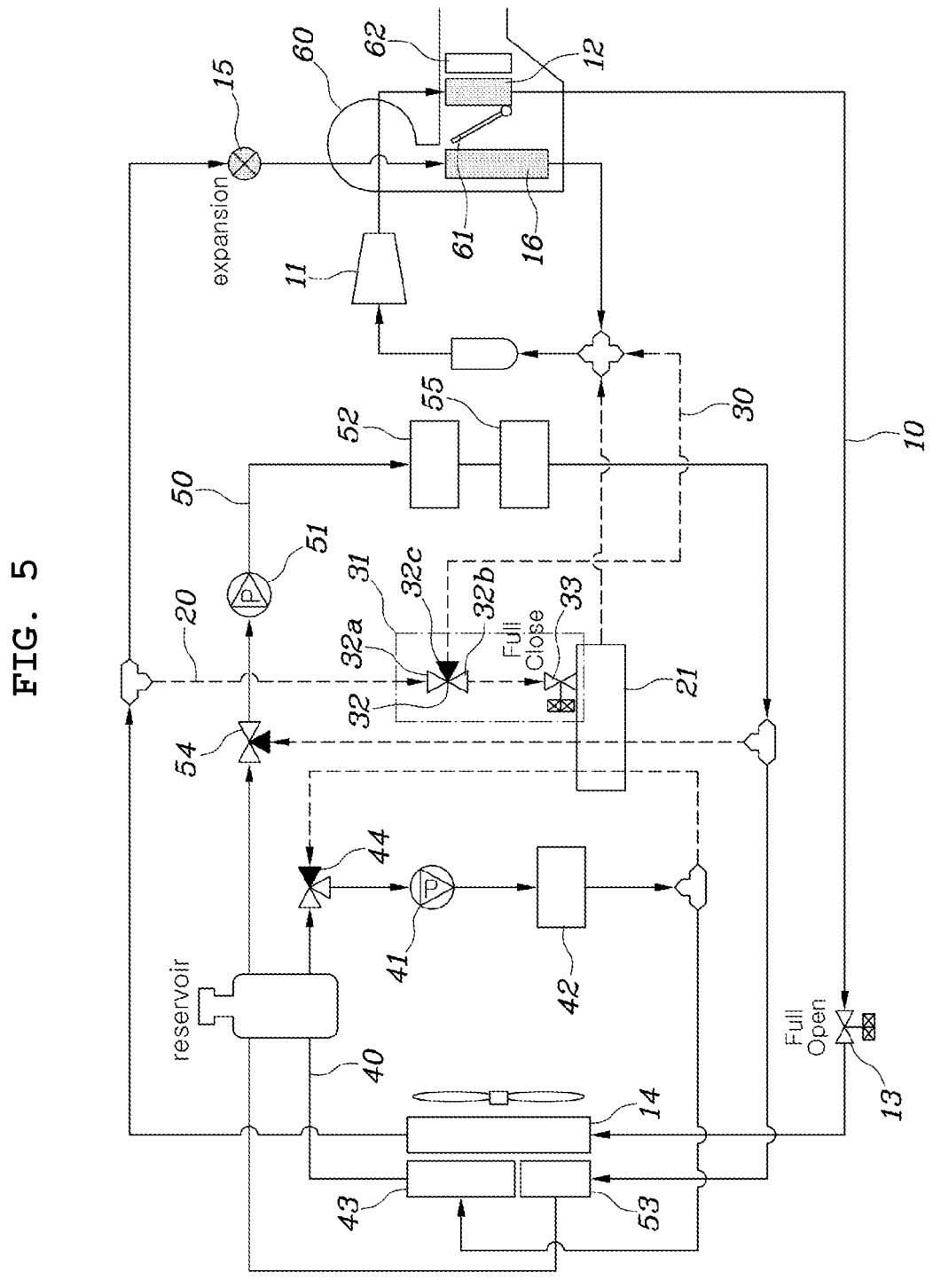
FIG. 5 is a view illustrating that the integrated thermal management system according to an embodiment of the present invention cools a PE component by using outside air while cooling an interior.
Figure 6:
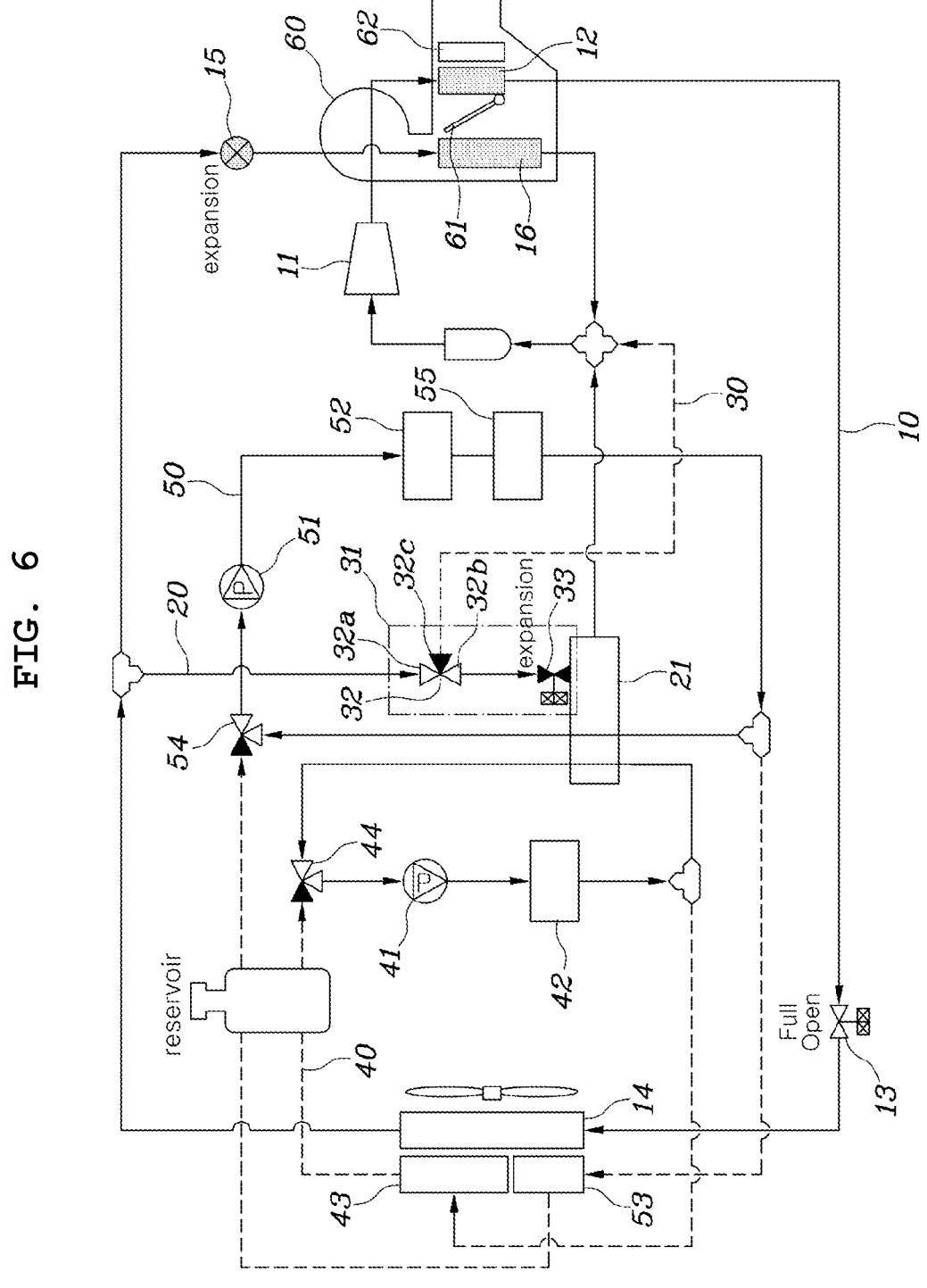
FIG. 6 is a view illustrating that the integrated thermal management system according to an embodiment of the present invention cools the PE component by using an integrated heat exchanger while cooling the interior.

In addition, FIG. 4 is a view illustrating that the integrated thermal management system according to an embodiment of the present invention cools an interior, FIG. 5 is a view illustrating that the integrated thermal management system according to an embodiment of the present invention cools a PE component by using outside air while cooling the interior, and FIG. 6 is a view illustrating that the integrated thermal management system according to an embodiment of the present invention cools the PE component by using an integrated heat exchanger while cooling the interior.

Figure 7:
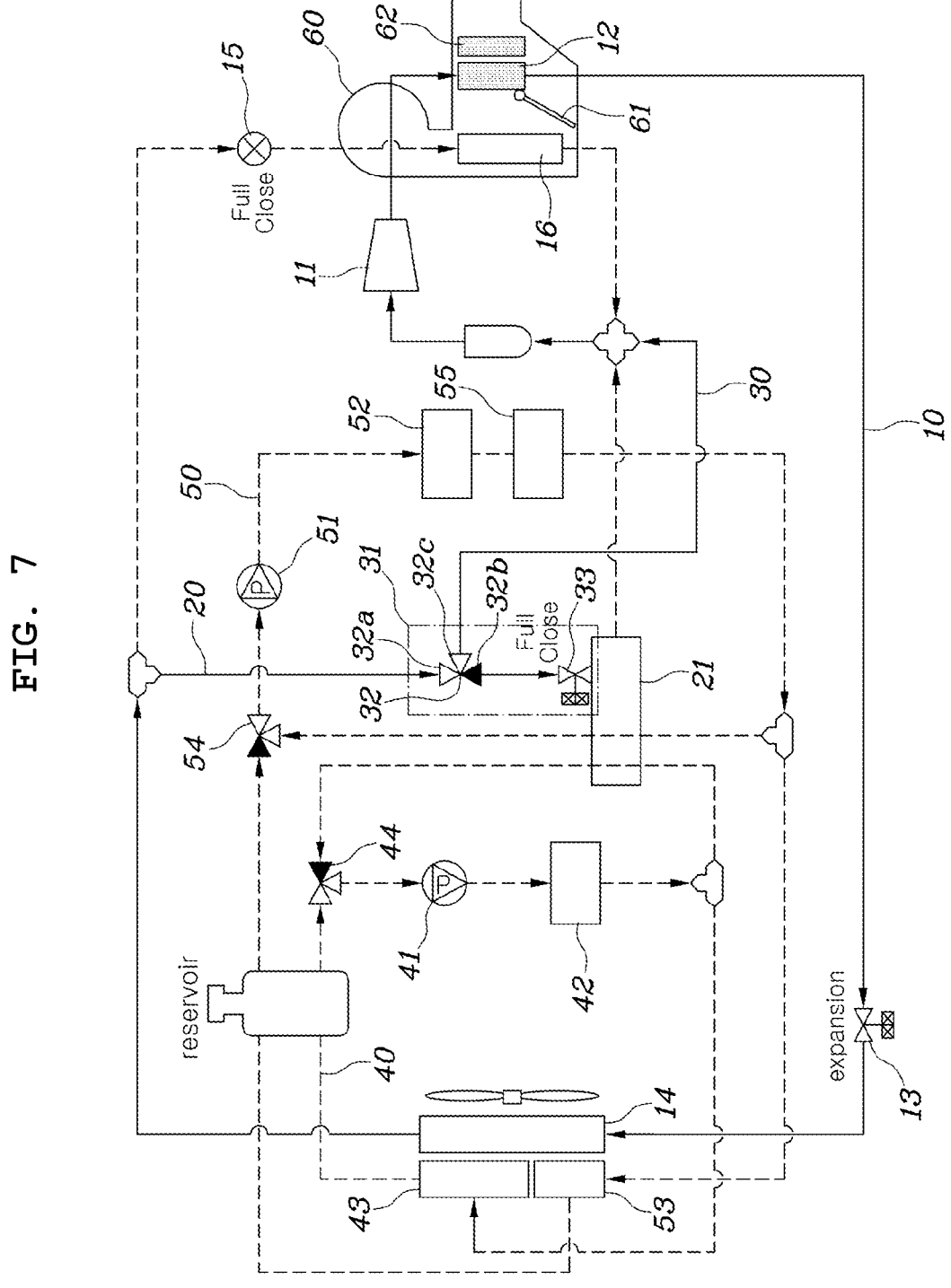
FIG. 7 is a view illustrating that the integrated thermal management system according to an embodiment of the present invention heats the interior.
Figure 8:
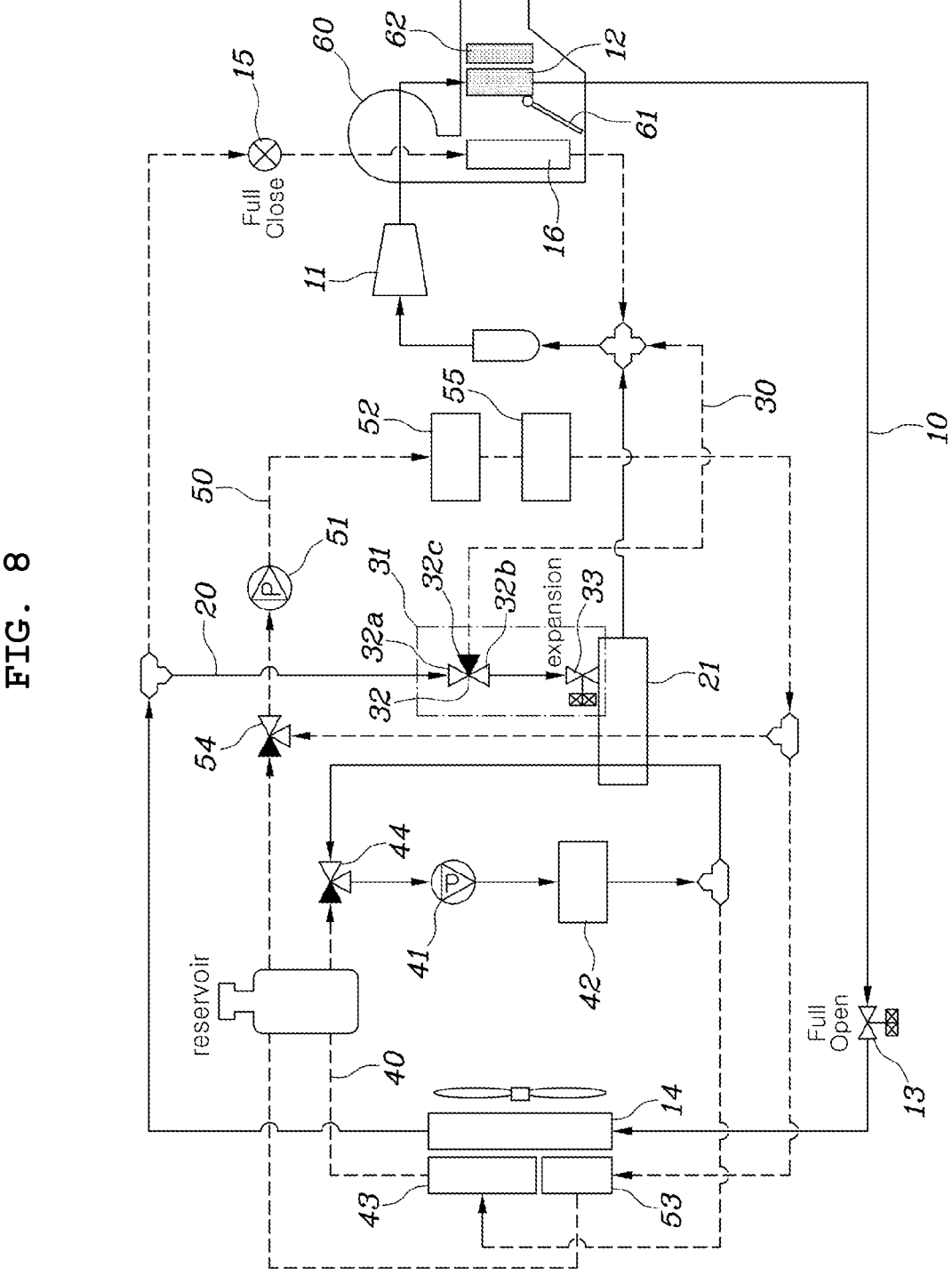
FIG. 8 is a view illustrating that the integrated thermal management system according to an embodiment of the present invention heats the interior and cools the PE component.
Figure 9:
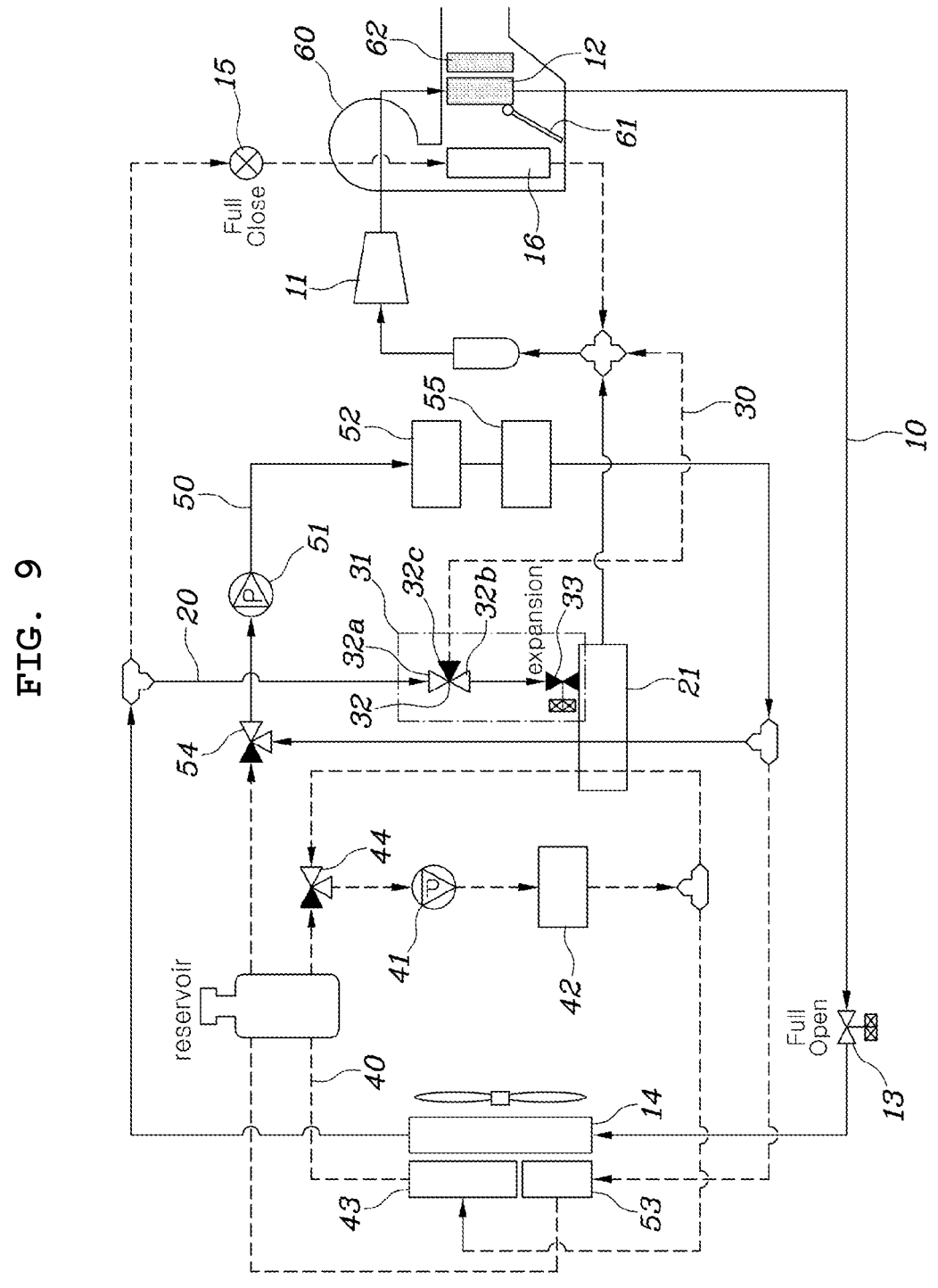
FIG. 9 is a view illustrating that the integrated thermal management system according to an embodiment of the present invention heats the interior and cools the battery.
Figure 10:
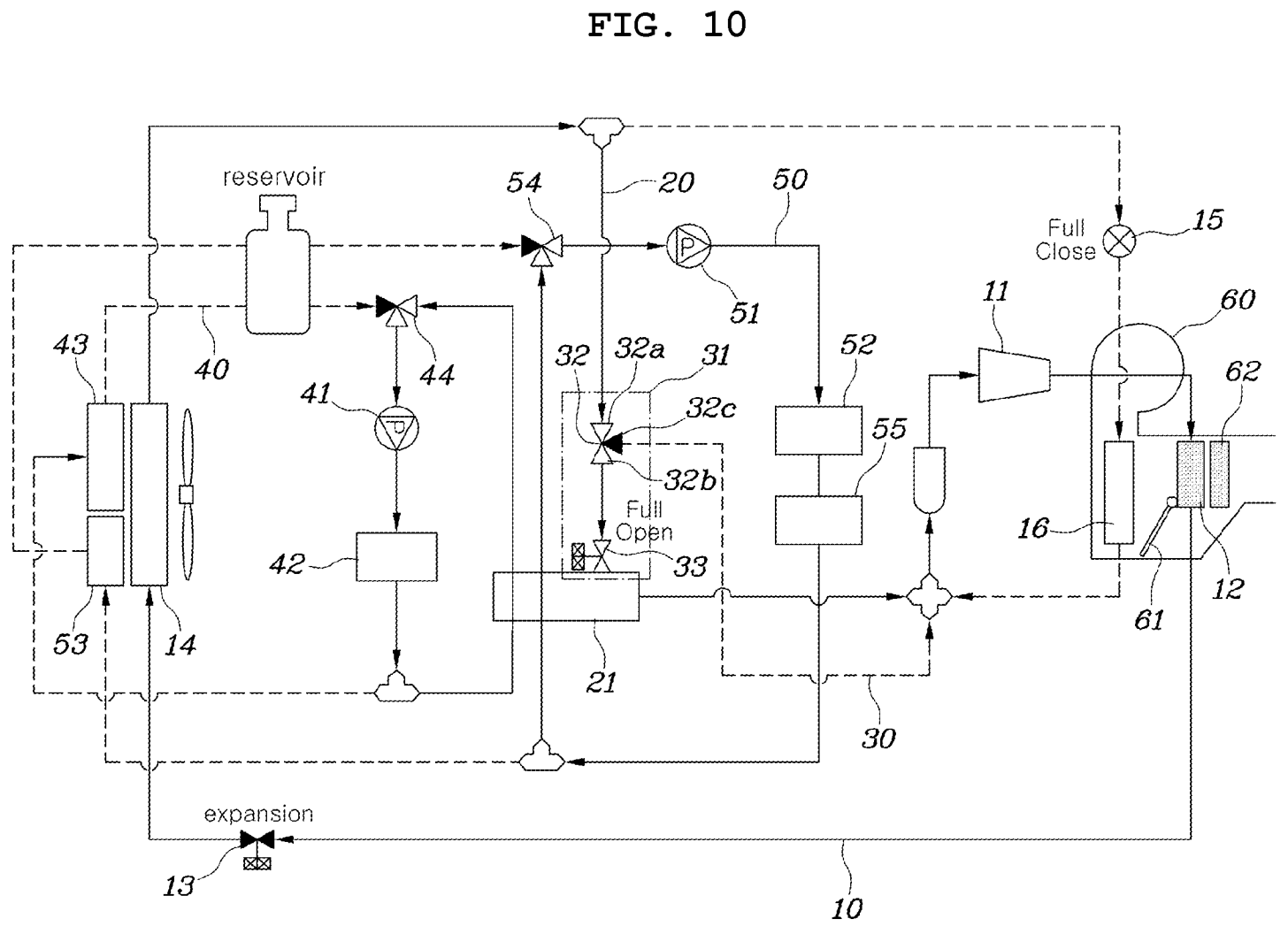
Figure 11:
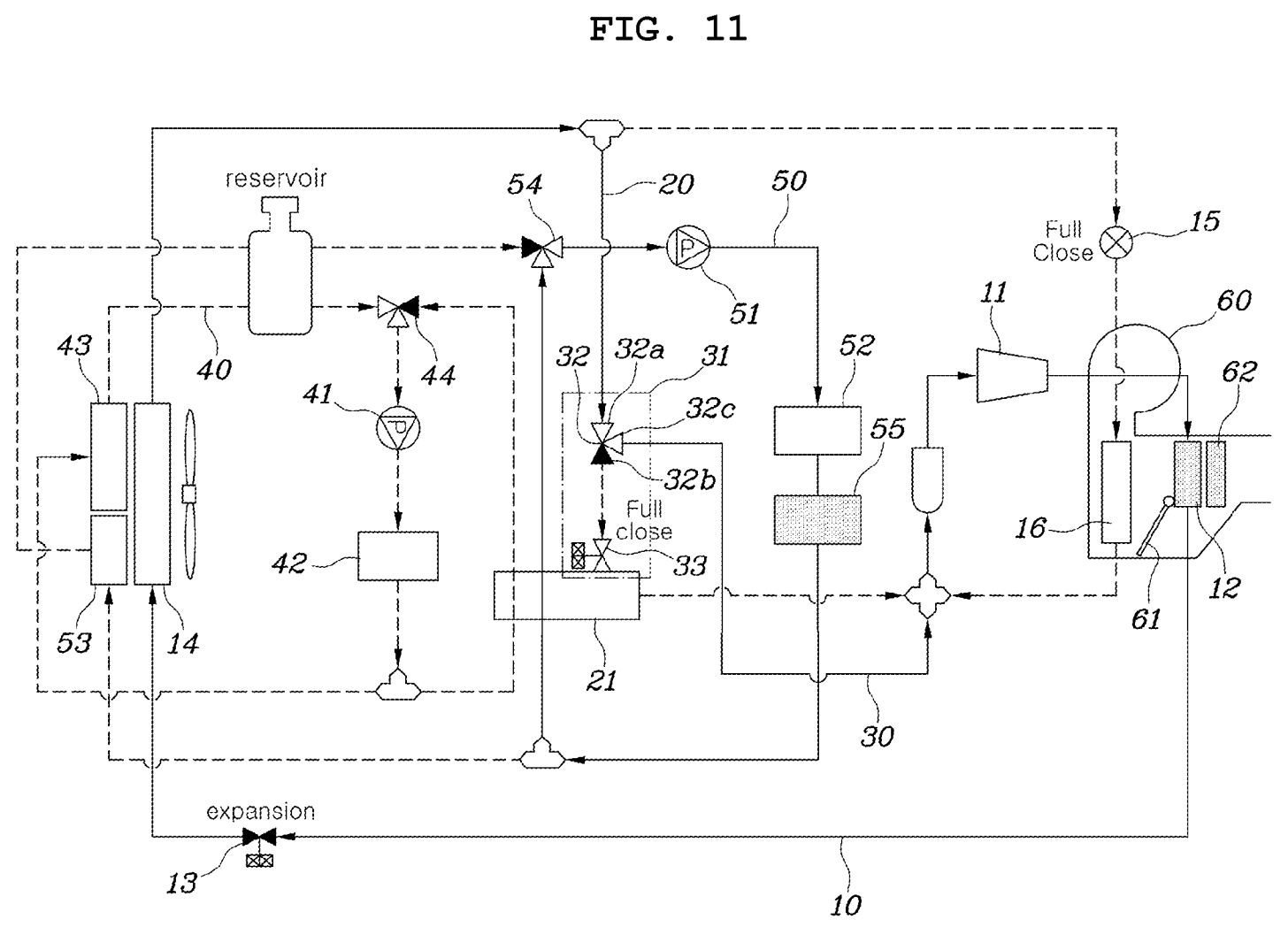

In addition, FIG. 7 is a view illustrating that the integrated thermal management system according to an embodiment of the present invention heats the interior, FIG. 8 is a view illustrating that the integrated thermal management system according to an embodiment of the present invention heats the interior and cools the PE component, FIG. 9 is a view illustrating that the integrated thermal management system according to an embodiment of the present invention heats the interior and cools the battery, FIG. 10 is a view illustrating that the integrated thermal management system according to an embodiment of the present invention absorbs heat of outside air, cools the PE component, and cools the battery while heating the interior, and FIG. 11 is a view illustrating that the integrated thermal management system according to an embodiment of the present invention raises a temperature of the battery while heating the interior.

Figure 12:
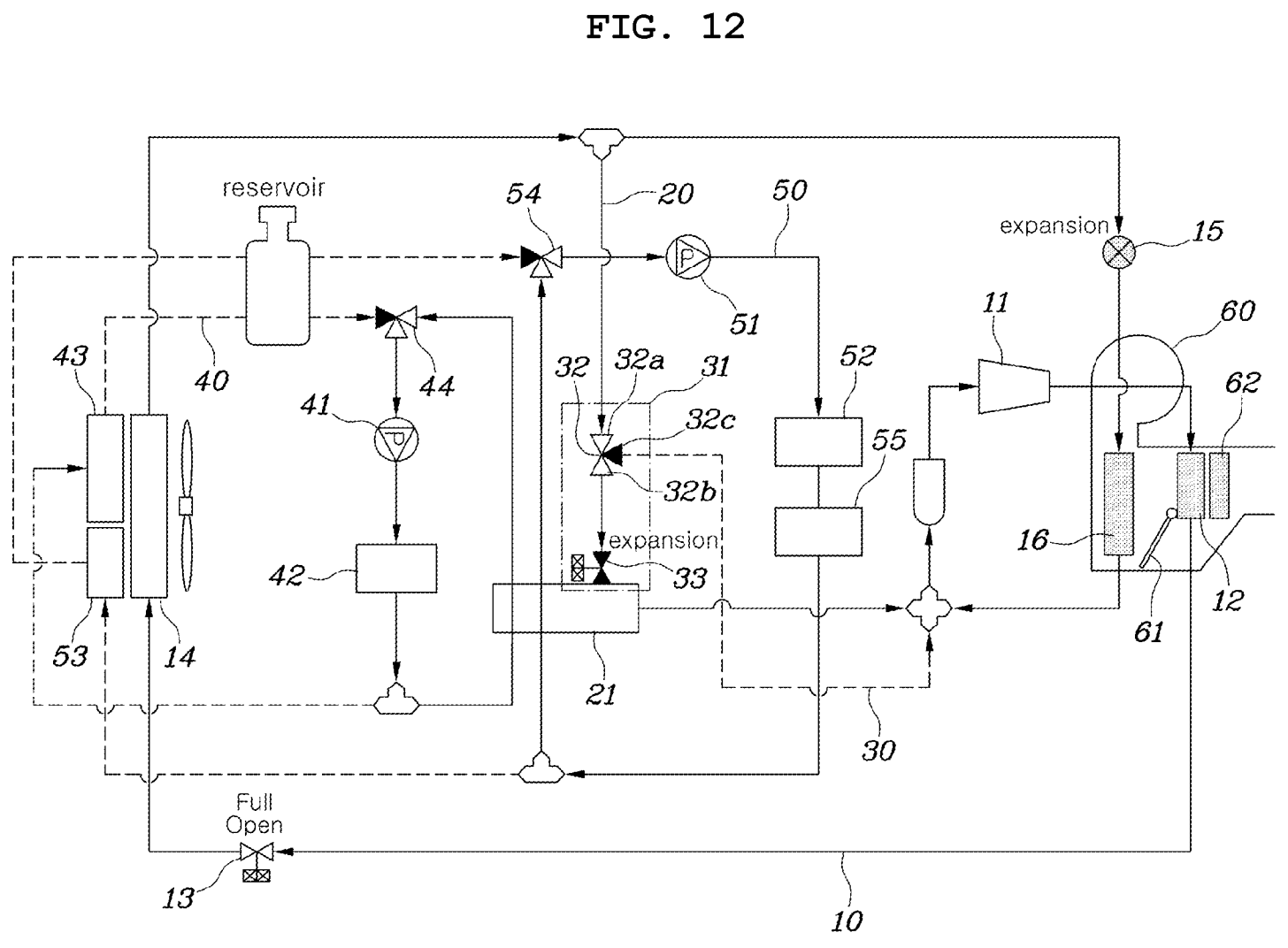
Figure 13:
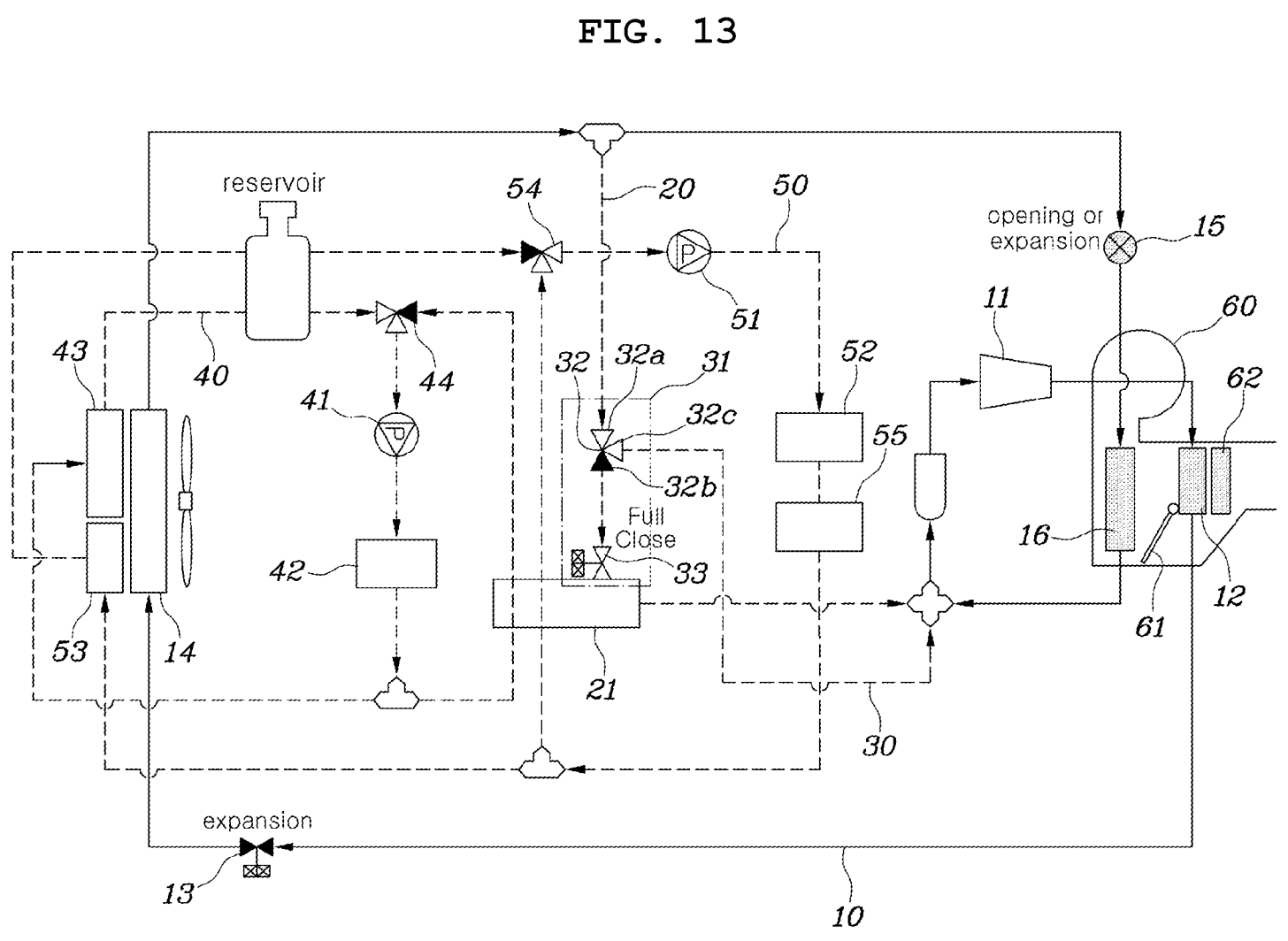
Figure 14:
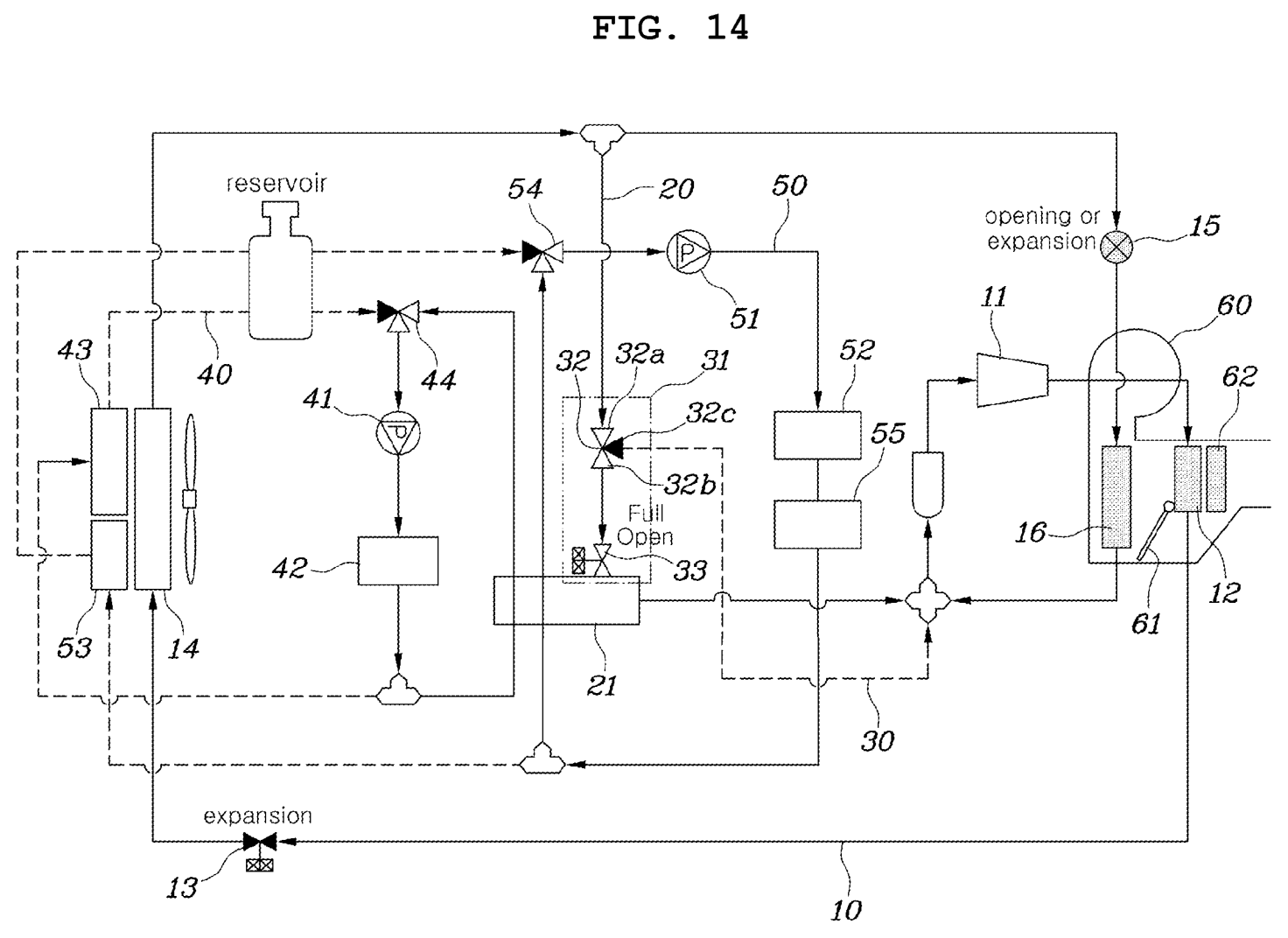

In addition, FIG. 12 is a view illustrating that the integrated thermal management system according to an embodiment of the present invention cools the PE component or cools the battery while heating and dehumidifying the interior, FIG. 13 is a view illustrating that a refrigerant absorbs heat of the outside air while the integrated thermal management system according to an embodiment of the present invention heats and dehumidifies the interior, and FIG. 14 is a view illustrating that the integrated thermal management system according to an embodiment of the present invention cools the PE component or cools the battery while heating and dehumidifying the interior while the refrigerant absorbs heat of outside air.

As illustrated in FIGS. 1 to 3, the integrated thermal management system according to embodiments of the present invention includes a first refrigerant line 10 configured to allow a refrigerant to flow therethrough and including a compressor 11, an interior heat exchanger 12, a first expander 13, an exterior heat exchanger 14, a second expander 15, and an evaporator 16, a second refrigerant line 20 including an integrated heat exchanger 21 and branching off from a rear end of the exterior heat exchanger 14 of the first refrigerant line 10, the second refrigerant line 20 being connected to a front end of the compressor 11, a third refrigerant line 30 branching off from a front end of the integrated heat exchanger 21 of the second refrigerant line 20 and connected to the front end of the compressor 11, an expansion module 31 provided at a branch point between the second refrigerant line 20 and the third refrigerant line 30 and configured to allow the refrigerant having passed through the first refrigerant line 10 to flow to the integrated heat exchanger 21 or to flow through the third refrigerant line 30, the expansion module 31 being configured to selectively expand the refrigerant flowing to the integrated heat exchanger 21, a first coolant line 40 configured to allow a coolant to flow therethrough and connected to the integrated heat exchanger 21 so that the coolant exchanges heat with the refrigerant, the first coolant line 40 including a first water pump 41, a PE component 42, a first radiator 43, and a first valve 44, and a second coolant line 50 configured to allow the coolant to flow therethrough and connected to the integrated heat exchanger 21 so that the coolant exchanges heat with the refrigerant, the second coolant line 50 including a second water pump 51, a battery 52, a second radiator 53, and a second valve 54.

Meanwhile, in an air conditioning housing 60 in which the interior heat exchanger 12 and the evaporator 16 are provided, a temperature adjustment door 61 may be disposed between the evaporator 16 and the interior heat exchanger 12 and adjust a temperature of conditioning air, and a heater device 62 may be disposed rearward of the interior heat exchanger 12 and supplement a heat source during an operation. That is, a temperature of the air flowing through the air conditioning housing 60 is adjusted as the air passes through the interior heat exchanger 12 and the evaporator 16. The air flows selectively to the interior heat exchanger 12 depending on a position of the temperature adjustment door 61, such that cooling air or heating air may be produced. In this case, the heater device 62 may be configured as a PTC heater and supplement the heat source during a heating process.

In embodiments of the present invention, the plurality of refrigerant lines is provided, and a flow direction of the refrigerant is selectively switched to each of the refrigerant lines, such that the refrigerant flows selectively to each of the refrigerant lines, which makes it possible to perform cooling, heating, and air conditioning on the interior and implement a heat pump.

In particular, the single integrated heat exchanger 21 allows the refrigerant and the coolant to exchange heat with each other, and an additional refrigerant line and the expansion module 31 may efficiently implement the heat pump, raise a temperature of the battery 52, and condition the air in the interior.

That is, in embodiments of the present invention, the refrigerant lines include the first refrigerant line 10, the second refrigerant line 20, and the third refrigerant line. The high-temperature, high-pressure refrigerant compressed by the compressor 11 provided in the first refrigerant line 10 is condensed by passing through the interior heat exchanger 12 and the exterior heat exchanger 14. The condensed refrigerant may be expanded by the second expander 15 and flow to the evaporator 16. Therefore, the interior heat exchanger 12 may produce the heating air, and the evaporator 16 may produce the cooling/dehumidifying air.

Meanwhile, the integrated heat exchanger 21 is provided in the second refrigerant line 20 branching off from the first refrigerant line 10. The integrated heat exchanger 21 allows the refrigerant having passed through the first refrigerant line 10 to exchange heat with the coolant in the first coolant line 40 and the coolant in the second coolant line 50 and implements the heat pump.

To this end, an embodiment of the present invention includes the first coolant line 40 configured to allow the coolant to flow therethrough and connected to the integrated heat exchanger 21 so that the coolant exchanges heat with the refrigerant, the first coolant line 40 including the first water pump 41, the PE component 42, the first radiator 43, and the first valve 44, and the second coolant line 50 configured to allow the coolant to flow therethrough and connected to the integrated heat exchanger 21 so that the coolant exchanges heat with the refrigerant, the second coolant line 50 including the second water pump 51, the battery 52, the second radiator 53, and the second valve 54.

That is, the coolant is circulated in the first coolant line 40 by an operation of the first water pump 41 and cools the PE component 42. In this case, the PE component 42 is an electrical component of an electric mobility, and a temperature of the PE component 42 needs to be managed to satisfy a smooth operational condition. The coolant, which has cooled the PE component 42 as described above, flows to the integrated heat exchanger 21 or the first radiator 43 depending on an opening/closing condition of the first valve 44. When the coolant flows to the integrated heat exchanger 21, the coolant may be cooled by exchanging heat with the refrigerant. When the coolant flows to the first radiator 43, the coolant may be cooled by exchanging heat with outside air. Therefore, the first valve 44 may be configured to circulate the coolant, which has circulated through the first water pump 41 and the PE component 42, selectively to the first radiator 43 or to the integrated heat exchanger 21. Therefore, a temperature of the PE component 42 may be managed as an appropriate temperature in the first coolant line 40, and a temperature of the refrigerant is adjusted by means of heat exchange between the coolant and the refrigerant in the integrated heat exchanger 21, such that the heat pump may be implemented.

The coolant is circulated in the second coolant line 50 by an operation of the second water pump 51 and cools the battery 52. The coolant, which has cooled the battery 52 as described above, flows to the integrated heat exchanger 21 or to the second radiator 53 depending on an opening/ closing condition of the second valve 54. When the coolant flows to the integrated heat exchanger 21, the coolant may be cooled by exchanging heat with the refrigerant. When the coolant flows to the second radiator 53, the coolant may be cooled by exchanging heat with outside air. Therefore, the second valve 54 may be configured to circulate the coolant, which has circulated through the second water pump 51 and the battery 52, selectively to the second radiator 53 or to the integrated heat exchanger 21. Therefore, a temperature of the battery 52 may be managed as an appropriate temperature in the second coolant line 50, and a temperature of the refrigerant is adjusted by means of heat exchange between the coolant and the refrigerant in the integrated heat exchanger 21, such that the heat pump may be implemented. In this case, the second coolant line 50 may further include a coolant heater 55 to efficiently manage the temperature of the battery 52.

Meanwhile, the refrigerant line further includes the third refrigerant line 30 branching off from the front end of the integrated heat exchanger 21 of the second refrigerant line 20 and connected to the front end of the compressor 11. The expansion module 31 is provided at the branch point between the second refrigerant line 20 and the third refrigerant line 30. The expansion module 31 allows the refrigerant having passed through the first refrigerant line 10 to flow to the integrated heat exchanger 21 or to flow through the third refrigerant line 30. The expansion module 31 selectively expands the refrigerant flowing to the integrated heat exchanger 21.

The expansion module 31 may be applied to various embodiments.

In one embodiment, the expansion module 31 includes a first port 32a configured to selectively communicate with the first refrigerant line 10, a second port 32b configured to selectively communicate with the integrated heat exchanger 21, and a third port 32c configured to selectively communicate with the third refrigerant line 30. A third expander 33 may be integrated with the expansion module 31 to selectively expand the refrigerant flowing from the first port 32a to the second port 32b.

As can be seen in FIG. 1, the expansion module 31 is disposed in the second refrigerant line 20 and is provided at the branch point of the third refrigerant line. The expansion module 31 selectively opens or closes the first port 32a, the second port 32b, and the third port 32c to allow the refrigerant introduced from the first refrigerant line 10 to flow to the integrated heat exchanger 21 or to bypass the integrated heat exchanger 21 through the third refrigerant line 30. In particular, in the expansion module 31, the third expander 33 may be integrated with the first port 32a or the second port 32b and selectively expand the refrigerant flowing from the first port 32a to the second port 32b.

That is, when the first port 32a of the expansion module 31 is opened, the refrigerant may flow from the first refrigerant line 10 to the second refrigerant line 20. When the second port 32b is opened, the refrigerant may flow to the integrated heat exchanger 21. In this case, the refrigerant flowing through the integrated heat exchanger 21 may be selectively expanded depending on whether the third expander 33 expands the refrigerant. In addition, when the third port 32c is opened, the refrigerant may bypass the integrated heat exchanger 21 and recirculate to the compressor 11. Therefore, the expansion module 31 may selectively implement a flow of the refrigerant so that the refrigerant flows to the integrated heat exchanger 21, the refrigerant is expanded and then flows to the integrated heat exchanger 21, or the refrigerant bypasses the integrated heat exchanger 21 and then flows to the compressor 11.

Further, in the expansion module 31 according to the embodiment, the third expander 33 may be integrated with the first port 32a or the second port 32b, thereby miniaturizing the refrigerant circuit.

As another embodiment, the expansion module 31 may include a switching valve 32 including the first port 32a configured to selectively communicate with the first refrigerant line 10, the second port 32b configured to selectively communicate with the integrated heat exchanger 21, and the third port 32c configured to selectively communicate with the third refrigerant line 30, and the third expander 33 spaced apart from the switching valve 32 and provided at the front end of the integrated heat exchanger 21.

As can be seen in FIG. 2, the expansion module 31 may be configured such that the switching valve 32 for switching a flow direction of the refrigerant and the third expander 33 for expanding the refrigerant are separated from each other. In this case, the switching valve 32 is disposed in the second refrigerant line 20 and is provided at the branch point of the third refrigerant line 30. The switching valve 32 selectively opens or closes the first port 32a, the second port 32b, and the third port 32c to allow the refrigerant introduced from the first refrigerant line 10 to flow to the integrated heat exchanger 21 or to bypass the integrated heat exchanger 21 through the third refrigerant line 30. The third expander 33 is disposed in the second refrigerant line 20 and is spaced apart from the switching valve 32. The third expander 33 is provided at the front end of the integrated heat exchanger 21 and selectively expands the refrigerant discharged from the second port 32b of the switching valve 32.

That is, the expansion module 31 may operate the switching valve 32 to selectively implement a flow of the refrigerant so that the refrigerant flows to the integrated heat exchanger 21, or the refrigerant bypasses the integrated heat exchanger 21 and then flows to the compressor 11. In addition, the refrigerant, which passes through the second port 32b of the expansion module 31 and flows to the integrated heat exchanger 21, is selectively expanded depending on whether the third expander 33 operates.

In the expansion module 31 according to another embodiment, the switching valve 32 and the third expander 33 are separated from each other, such that a degree of freedom with respect to an installation position on the refrigerant circuit is ensured, and the installation is facilitated.

The expansion module 31 may implement the interior air conditioning and various thermal management modes by switching the flow direction of the refrigerant and expanding the refrigerant. That is, the refrigerant having passed through the second refrigerant line 20 may flow to the integrated heat exchanger 21 by the expansion module 31 or bypass the integrated heat exchanger 21 through the third refrigerant line 30 and then flow to the compressor 11. In addition, the expansion module 31 may selectively expand the refrigerant flowing to the integrated heat exchanger 21 or block the flow of the refrigerant by being closed.

Therefore, according to embodiments of the present invention, the temperature of the conditioning air may be adjusted by the interior heat exchanger 12 and the evaporator 16 by circulating the refrigerant to the respective refrigerant lines, and the heat exchange between the refrigerant and the coolant circulating through the first coolant line 40 and the second coolant line 50 may manage the temperature of the PE component 42 and the temperature of the battery 52 and implement the heat pump, thereby improving the energy efficiency. In addition, during the process of providing the conditioning air and managing the temperature of the PE component 42 and the temperature of the battery 52, the thermal management efficiency is improved by efficiently circulating the refrigerant, and the energy efficiency in heating the interior is improved by implementing the heat pump when the temperature of the battery 52 is raised.

In embodiments of the present invention, the controller 70 may control the compressor 11, the water pump, the expander, the valve, the expansion module 31, the temperature adjustment door 61, and the heater device 62 based on an air conditioning mode and a thermal management mode. The control will be described below in detail.

As illustrated in FIG. 4, at the time of cooling the interior, the controller 70 opens the first expander 13, allows the second expander 15 to perform the expansion operation, controls the expansion module 31 to block the flow of the refrigerant to the second refrigerant line 20, and controls the temperature adjustment door 61 so that the conditioning air does not pass through the interior heat exchanger 12.

Therefore, the refrigerant discharged from the compressor 11 passes through the first expander 13 and is condensed by the exterior heat exchanger 14, and the refrigerant is expanded by the second expander 15 and then introduced into the evaporator 16, such that the evaporator 16 absorbs outside heat and produces the cooling air.

In addition, in the air conditioning housing 60, the temperature adjustment door 61 is positioned to prevent the air from flowing to the interior heat exchanger 12, such that the cooling air having passed through the evaporator 16 is provided to the interior.

In addition, during the process of cooling the interior in which only the process of cooling the interior is performed without managing the temperature of the PE component 42 and the temperature of the battery 52 and implementing the heat pump, the expansion module 31 blocks the flow of the refrigerant to the second refrigerant line 20, such that the refrigerant circulates only through the first refrigerant circuit, and the efficiency in cooling the interior is ensured.

Meanwhile, as illustrated in FIG. 5, at the time of cooling the PE component 42 by using outside air during the process of cooling the interior, the controller 70 operates the first water pump 41 and controls the first valve 44 to circulate the coolant through the first radiator 43. At the time of cooling the battery 52 by using outside air during the process of cooling the interior, the controller 70 operates the second water pump 51 and controls the second valve 54 to circulate the coolant through the second radiator 53.

Therefore, because the coolant circulates through the first water pump 41, the PE component 42, and the first radiator 43 in the first coolant line 40, the coolant cools the PE component 42 and then exchanges heat with outside air through the first radiator 43, such that the temperature of the coolant may be managed.

In addition, because the coolant circulates through the second water pump 51, the battery 52, and the second radiator 53 in the second coolant line 50, the coolant cools the battery 52 and then exchanges heat with outside air through the second radiator 53, such that the temperature of the coolant may be managed.

As described above, the coolants respectively circulating through the first coolant line 40 and the second coolant line 50 are cooled by exchanging heat with outside air through the first radiator 43 and the second radiator 53, such that the temperatures of the coolants may be adjusted.

Further, because the PE component 42 and the battery 52 are cooled by outside air, the refrigerant circulates only through the first refrigerant line 10, such that the efficiency in cooling the interior may be maintained.

Meanwhile, as illustrated in FIG. 6, at the time of cooling the PE component 42 by using the integrated heat exchanger 21 during the process of cooling the interior, the controller 70 opens the first expander 13, allows the second expander 15 to perform the expansion operation, allows the expansion module 31 to expand the refrigerant while allowing the refrigerant to flow to the integrated heat exchanger 21, operates the first water pump 41, and controls the first valve 44 to circulate the coolant through the integrated heat exchanger 21.

That is, the heat exchange between the refrigerant and the coolant needs to be performed to cool the PE component 42 by using the integrated heat exchanger 21 during the process of cooling the interior. Therefore, the controller 70 operates the first water pump 41 and controls the first valve 44 so that the coolant circulates through the PE component 42 and the integrated heat exchanger 21. In addition, the controller 70 controls the expansion module 31 to allow the refrigerant to flow from the first refrigerant line 10 to the second refrigerant line 20 and to flow to the integrated heat exchanger 21, and the controller 70 controls the expansion module 31 to expand the refrigerant. Therefore, the refrigerant discharged from the compressor 11 passes through the first expander 13 and is condensed by the exterior heat exchanger 14, and a part of the refrigerant is expanded by the expansion module 31 in the second refrigerant line 20 and then flows to the integrated heat exchanger 21, such that the integrated heat exchanger 21 absorbs heat from the coolant in the first coolant line 40.

In addition, as the second expander 15 performs the expansion operation, the evaporator 16 may produce the cooling air.

Therefore, together with the process of cooling the interior, the refrigerant may exchange heat with the coolant in the first coolant line 40 through the integrated heat exchanger 21 and cool the PE component 42.

Meanwhile, as illustrated in FIG. 6, at the time of cooling the battery 52 by using the integrated heat exchanger 21 during the process of cooling the interior, the controller 70 opens the first expander 13, allows the second expander 15 to perform the expansion operation, allows the expansion module 31 to expand the refrigerant while allowing the refrigerant to flow to the integrated heat exchanger 21, operates the second water pump 51, and controls the second valve 54 to circulate the coolant through the integrated heat exchanger 21.

That is, the heat exchange between the refrigerant and the coolant needs to be performed to cool the battery 52 by using the integrated heat exchanger 21 during the process of cooling the interior. Therefore, the controller 70 operates the second water pump 51 and controls the second valve 54 so that the coolant circulates through the battery 52 and the integrated heat exchanger 21. The controller 70 controls the expansion module 31 to allow the refrigerant to flow from the first refrigerant line 10 to the second refrigerant line 20 and to flow to the integrated heat exchanger 21, and the controller 70 controls the expansion module 31 to expand the refrigerant. Therefore, the refrigerant discharged from the compressor 11 passes through the first expander 13 and is condensed by the exterior heat exchanger 14, and a part of the refrigerant is expanded by the expansion module 31 in the second refrigerant line 20 and then flows to the integrated heat exchanger 21, such that the integrated heat exchanger 21 absorbs heat from the coolant in the second coolant line 50.

In addition, as the second expander 15 performs the expansion operation, the evaporator 16 may produce the cooling air.

Therefore, together with the process of cooling the interior, the refrigerant may exchange heat with the coolant in the second coolant line 50 through the integrated heat exchanger 21 and cool the battery 52.

As described above, embodiments of the present invention may cool the interior and cool the PE component 42 and the battery 52. In addition, at the time of cooling the PE component 42 and the battery 52, the coolant circulating through the PE component 42 and the battery 52 may be cooled by outside air or cooled by exchanging heat with the refrigerant through the integrated heat exchanger 21 in consideration of an external environment or whether the heat pump is used.

Meanwhile, as illustrated in FIG. 7, at the time of heating the interior, the controller 70 may allow the first expander 13 to perform the expansion operation, close the second expander 15, control the expansion module 31 to allow the refrigerant to flow to the third refrigerant line 30, and control the temperature adjustment door 61 so that the conditioning air passes through the interior heat exchanger 12.

Therefore, the refrigerant discharged from the compressor 11 flows to the interior heat exchanger 12, such that the heating air is produced as the interior heat exchanger 12 radiates heat. As the first expander 13 performs the expansion operation, the exterior heat exchanger 14 absorbs outside heat. In this case, in the air conditioning housing 60, the temperature adjustment door 61 is positioned to allow the air to flow to the interior heat exchanger 12, such that the heating air having passed through the interior heat exchanger 12 is provided to the interior.

In addition, the second expander 15 is closed, and the expansion module 31 allows the refrigerant having passed through the second refrigerant line 20 to flow to the compressor 11 through the third refrigerant line 30, such that only the process of heating the interior is performed without managing the temperature of the PE component 42 and the temperature of the battery 52 and implementing the heat pump.

Meanwhile, as illustrated in FIG. 8, at the time of heating the interior and cooling the PE component 42, the controller 70 opens the first expander 13, closes the second expander 15, controls the expansion module to expand the refrigerant while allowing the refrigerant to flow to the integrated heat exchanger 21, operates the first water pump 41, and controls the first valve 44 so that the coolant flows to the integrated heat exchanger 21.

That is, the heat exchange between the refrigerant and the coolant needs to be performed to cool the PE component by using the integrated heat exchanger 21 during the process of heating the interior. Therefore, the controller 70 operates the first water pump 41 and controls the first valve 44 so that the coolant circulates through the PE component 42 and the integrated heat exchanger 21. In addition, the controller 70 controls the expansion module 31 to allow the refrigerant to flow from the second refrigerant line 20 to the integrated heat exchanger 21, and the controller 70 controls the expansion module 31 to expand the refrigerant. Therefore, the refrigerant discharged from the compressor 11 is condensed while producing the heating air in the interior heat exchanger 12, passes through the first expander 13, and is condensed again by the exterior heat exchanger 14. The refrigerant is expanded by the expansion module 31 and then flows to the integrated heat exchanger 21, such that the integrated heat exchanger 21 absorbs heat from the coolant in the first coolant line 40.

Therefore, the PE component 42 may be cooled by the heat exchange between the refrigerant and the coolant in the integrated heat exchanger 21 at the same time when the process of heating the interior is performed.

Meanwhile, as illustrated in FIG. 9, at the time of heating the interior and cooling the battery 52, the controller 70 opens the first expander 13, closes the second expander 15, controls the expansion module to expand the refrigerant while allowing the refrigerant to flow to the integrated heat exchanger 21, operates the second water pump 51, and controls the second valve 54 so that the coolant flows to the integrated heat exchanger 21.

A situation in which the battery 52 is cooled by the integrated heat exchanger 21 during the process of heating the interior may include a situation in which the battery 52 is quickly charged or a heat pump is implemented by using waste heat of the battery 52.

To this end, the controller 70 operates the second water pump 51 and controls the second valve 54 so that the coolant circulates through the battery 52 and the integrated heat exchanger 21. In addition, the controller 70 controls the expansion module 31 to allow the refrigerant to flow from the second refrigerant line 20 to the integrated heat exchanger 21, and the controller 70 controls the expansion module 31 to expand the refrigerant. Therefore, the refrigerant discharged from the compressor 11 is condensed while producing the heating air in the interior heat exchanger 12, passes through the first expander 13, and is condensed again by the exterior heat exchanger 14. The refrigerant is expanded by the expansion module 31 and then flows to the integrated heat exchanger 21, such that the integrated heat exchanger 21 absorbs heat from the coolant in the second coolant line 50.

Therefore, the battery 52 may be cooled by the heat exchange between the refrigerant and the coolant in the integrated heat exchanger 21 at the same time when the process of heating the interior is performed.

Meanwhile, as illustrated in FIG. 10, at the time of absorbing heat from the outside air, cooling the PE component 42, or cooling the battery 52 during the process of heating the interior, the controller 70 allows the first expander 13 to perform the expansion operation, closes the second expander 15, and controls the expansion module 31 so that the refrigerant flows to the integrated heat exchanger 21 and is not expanded. In this case, at the time of cooling the PE component 42, the controller may operate the first water pump 41 and control the first valve 44 to allow the coolant to flow to the integrated heat exchanger 21. At the time of cooling the battery 52, the controller may operate the second water pump 51 and control the second valve 54 to allow the coolant to flow to the integrated heat exchanger 21.

This is to ensure the heat exchange with outside air through the exterior heat exchanger 14 during the process of heating the interior.

To this end, the controller 70 controls the operation of the first water pump 41 and the operation of the second water pump 51 based on whether to cool the PE component 42 and whether to cool the battery 52, such that the coolant in the first coolant line 40 circulates through the PE component 42 and the integrated heat exchanger 21, and the coolant in the second coolant line 50 circulates through the battery 52 and the integrated heat exchanger 21. In addition, the controller 70 controls the expansion module 31 to allow the refrigerant to flow from the second refrigerant line 20 to the integrated heat exchanger 21. Therefore, the refrigerant discharged from the compressor 11 is condensed while producing the heating air in the interior heat exchanger 12 and expanded by the first expander 13, and then the refrigerant absorbs heat from the outside air in the exterior heat exchanger 14. In addition, the refrigerant passes through the integrated heat exchanger 21 and exchanges heat with the coolants in the first coolant line 40 and the second coolant line 50.

Therefore, the PE component 42 and the battery 52 may be cooled by the heat exchange between the refrigerant and the coolant in the integrated heat exchanger 21 at the same time when the process of heating the interior is performed.

In particular, in embodiments of the present invention, the second coolant line 50 further includes the coolant heater 55. The third refrigerant line 30 branches off from the second refrigerant line 20 and selectively bypasses the integrated heat exchanger 21 through the expansion module 31. Therefore, at the time of raising the temperature of the battery 52, the controller 70 may control and operate the coolant heater 55 and control the expansion module 31 so that the refrigerant bypasses the integrated heat exchanger 21 through the third refrigerant line 30 without flowing to the integrated heat exchanger 21. Therefore, at the time of raising the temperature of the battery 52, the flow of the refrigerant to the integrated heat exchanger 21 is blocked, such that the deterioration in performance in raising the temperature of the battery 52 is prevented, and the efficient management of the temperatures of the refrigerant and the coolant including the management of the temperature of the battery 52 is easily performed.

For example, as illustrated in FIG. 11, at the time of heating the interior, the controller 70 allows the first expander 13 to perform the expansion operation, closes the second expander 15, controls the expansion module 31 to allow the refrigerant to flow to the third refrigerant line 30, and controls the temperature adjustment door 61 so that the conditioning air passes through the interior heat exchanger 12. In addition, as the second water pump 51 and the coolant heater 55 operate, the coolant in the second coolant line 50 is heated by the coolant heater 55, the refrigerant does not flow to the integrated heat exchanger 21, and the heat exchange with the refrigerant is blocked, such that the management of the temperature of the coolant may be performed to raise the temperature of the battery 52.

Meanwhile, as illustrated in FIG. 12, at the time of cooling the PE component 42 or cooling the battery 52 during the process of heating and dehumidifying the interior, the controller 70 opens the first expander 13, allows the second expander 15 to perform the expansion operation, and controls the expansion module so that the refrigerant flows to the integrated heat exchanger 21 and is expanded. In this case, at the time of cooling the PE component 42, the controller operates the first water pump 41 and controls the first valve 44 to allow the coolant to flow to the integrated heat exchanger 21. At the time of cooling the battery 52, the controller operates the second water pump 51 and controls the second valve 54 to allow the coolant to flow to the integrated heat exchanger 21.

The controller 70 controls the operation of the first water pump 41 and the operation of the second water pump 51 based on whether to cool the PE component 42 and whether to cool the battery 52, such that the coolant in the first coolant line 40 circulates through the PE component 42 and the integrated heat exchanger 21, and the coolant in the second coolant line 50 circulates through the battery 52 and the integrated heat exchanger 21.

In this case, the first expander 13 is opened, and the second expander 15 performs the expansion operation, such that the refrigerant discharged from the compressor 11 is condensed while producing the heating air in the interior heat exchanger 12, passes through the first expander 13, and is condensed again by the exterior heat exchanger 14. A part of the refrigerant is expanded by the second expander 15 and flows to the evaporator 16, such that the dehumidification is performed by the evaporator 16. In this case, in the air conditioning housing 60, the temperature adjustment door 61 is positioned to allow the air to pass through the interior heat exchanger 12, such that the air dehumidified by the evaporator 16 passes through the interior heat exchanger 12 and the heater device 62 and is provided, as dehumidified heating air, to the interior.

In addition, the controller 70 controls the expansion module 31 so that the refrigerant flows from the second refrigerant line 20 to the integrated heat exchanger 21 and is expanded. Therefore, a part of the refrigerant circulating through the first refrigerant line 10 is expanded by the expansion module 31 and flows to the integrated heat exchanger 21, such that the integrated heat exchanger 21 absorbs heat from the coolant in the first coolant line 40 or heat from the coolant of the second coolant line 50.

Therefore, the PE component 42 and the battery 52 may be cooled by the heat exchange between the refrigerant and the coolant in the integrated heat exchanger 21 at the same time when the process of heating and dehumidifying the interior is performed.

Meanwhile, at the time of absorbing heat from the outside air by the refrigerant during the process of heating and dehumidifying the interior, the controller 70 may allow the first expander 13 to perform the expansion operation, open the second expander 15, control the expansion module 31 to block the flow of the refrigerant to the second refrigerant line 20, and control the temperature adjustment door 61 so that the conditioning air passes through the interior heat exchanger 12.

That is, during the process of heating and dehumidifying the interior, the controller 70 may perform the corresponding control when the controller determines that the management of the temperature of the refrigerant is required by absorbing heat from the outside air in the exterior heat exchanger 14.

As illustrated in FIG. 13, at the time of absorbing heat from the outside air by the refrigerant during the process of heating and dehumidifying the interior, the controller 70 allows the first expander 13 to perform the expansion operation, opens the second expander 15, and controls the expansion module 31 to block the flow of the refrigerant to the second refrigerant line 20, such that the refrigerant discharged from the compressor 11 flows to the interior heat exchanger 12, produces the heating air, and then is expanded by the first expander 13. Therefore, the exterior heat exchanger 14 absorbs heat from the outside air while serving as the evaporator 16. In this case, when the second expander 15 is opened, the evaporator 16 also activates the dehumidification while absorbing heat from the outside air, such that the air in the air conditioning housing 60 may pass through the evaporator 16 and the interior heat exchanger 12 and be provided, as the dehumidified heating air, to the interior. In this case, the second expander 15 may switch to the expansion operation in accordance with the required amount of dehumidification through the evaporator 16.

Meanwhile, as illustrated in FIG. 14, at the time of cooling the PE component 42 or cooling the battery 52 during the process of absorbing heat from the outside air by the refrigerant and heating and dehumidifying the interior, the controller 70 controls the expansion module 31 so that the refrigerant flows to the integrated heat exchanger 21, and the refrigerant is not expanded. In this case, at the time of cooling the PE component 42, the controller operates the first water pump 41 and controls the first valve 44 to allow the coolant to flow to the integrated heat exchanger 21. At the time of cooling the battery 52, the controller operates the second water pump 51 and controls the second valve 54 to allow the coolant to flow to the integrated heat exchanger 21.

That is, at the time of additionally cooling the PE component 42 or cooling the battery 52 in the state in which the refrigerant absorbs heat from the outside air during the process of heating and dehumidifying the interior, the controller 70 controls the expansion module 31 so that the refrigerant flows from the second refrigerant line 20 to the integrated heat exchanger 21, and the refrigerant is not expanded. Therefore, the refrigerant expanded by the first expander 13 flows to the integrated heat exchanger 21, such that the integrated heat exchanger 21 absorbs heat from the coolant in the first coolant line 40 or heat from the coolant in the second coolant line 50.

Therefore, the PE component 42 and the battery 52 may be cooled by the heat exchange between the refrigerant and the coolant in the integrated heat exchanger 21 at the same time when the process of heating and dehumidifying the interior is performed.

According to the integrated thermal management system structured as described above, the single integrated heat exchanger 21 implements the process of cooling the PE component 42 and the battery 52 and implements the heat pump by means of the heat exchange with the refrigerant, which makes it possible to make the entire circuit compact and implement the heat pump by improving the refrigerant circuit even during the process of raising the temperature of the battery 52. As described above, the heat pump may be implemented at the time of raising the temperature of the battery 52, which improves the energy efficiency in heating the interior.

In addition, based on various types of thermal management modes, the process of cooling the electrical components and the battery 52 and the process of heating the interior by using the waste heat of the electrical components and the battery 52 are performed by means of the heat exchange between the coolants circulating through the respective coolant lines and the refrigerant circulating through the refrigerant line, such that the thermal management efficiency is improved, which makes it possible to ensure the traveling distance of the motorized mobility.

While the specific embodiments of the present invention have been illustrated and described, it will be obvious to those skilled in the art that the present invention may be variously modified and changed without departing from the technical spirit of the present invention defined in the appended claims.

What is claimed is:

1. An integrated thermal management system, the integrated thermal management system comprising:

a first refrigerant line configured to allow a refrigerant to flow therethrough and comprising:

a compressor;

an interior heat exchanger;

a first expander;

an exterior heat exchanger;

a second expander; and an evaporator, wherein the interior heat exchanger and the evaporator are provided in an air conditioning housing in which:

a temperature adjustment door is disposed between the evaporator and the interior heat exchanger and is configured to adjust a temperature of conditioning air, and a heater device is disposed rearward of the interior heat exchanger and is configured to supplement a heat source during an operation;

a second refrigerant line comprising an integrated heat exchanger and branching off from a rear end of the exterior heat exchanger of the first refrigerant line, the second refrigerant line being connected to a front end of the compressor;

a third refrigerant line branching off from a front end of the integrated heat exchanger of the second refrigerant line, connected to the front end of the compressor, and configured to bypass the integrated heat exchanger;

an expansion module provided at a branch point between the second refrigerant line and the third refrigerant line and configured to allow the refrigerant having passed through the first refrigerant line to flow to the integrated heat exchanger or to flow through the third refrigerant line, the expansion module being configured to selectively expand the refrigerant flowing to the integrated heat exchanger;

a first coolant line configured to allow a coolant to flow therethrough and connected to the integrated heat exchanger so that the coolant exchanges heat with the refrigerant, the first coolant line comprising a first water pump, a PE component, a first radiator, and a first valve; and a second coolant line configured to allow the coolant to flow therethrough and connected to the integrated heat exchanger so that the coolant exchanges heat with the refrigerant, the second coolant line comprising a second water pump, a battery, a second radiator, and a second valve.

2. The integrated thermal management system of claim 1, further comprising a controller configured to control the compressor, the first water pump, the first expander, the first valve, the expansion module, the temperature adjustment door, and the heater device based on an air conditioning mode and a thermal management mode.

3. The integrated thermal management system of claim 2, wherein:

the second coolant line further comprises a coolant heater, and the controller is configured to control and operate the coolant heater at a time of raising a temperature of the battery.

4. The integrated thermal management system of claim 2, wherein at a time of cooling an interior, the controller is further configured to:

open the first expander;

allow the second expander to perform an expansion operation;

control the expansion module to block a flow of the refrigerant to the second refrigerant line; and control the temperature adjustment door so that the conditioning air does not pass through the interior heat exchanger.

5. The integrated thermal management system of claim 4, wherein:

at a time of cooling the PE component by using outside air at the time of cooling the interior, the controller is further configured to:

operate the first water pump; and control the first valve to circulate the coolant through the first radiator, and at a time of cooling the battery by using the outside air at the time of cooling the interior, the controller is further configured to:

operate the second water pump; and control the second valve to circulate the coolant through the second radiator.

6. The integrated thermal management system of claim 4, wherein at a time of cooling the battery by using the integrated heat exchanger at the time of cooling the interior, the controller is further configured to:

open the first expander;

allow the second expander to perform the expansion operation;

allow the expansion module to expand the refrigerant while allowing the refrigerant to flow to the integrated heat exchanger;

operate the second water pump; and control the second valve to circulate the coolant through the integrated heat exchanger.

7. The integrated thermal management system of claim 2, wherein at a time of cooling the PE component by using the integrated heat exchanger during a process of cooling an interior, the controller is further configured to:

open the first expander;

allow the second expander to perform an expansion operation;

allow the expansion module to expand the refrigerant while allowing the refrigerant to flow to the integrated heat exchanger;

operate the first water pump; and control the first valve to circulate the coolant through the integrated heat exchanger.

8. The integrated thermal management system of claim 2, wherein at a time of heating an interior, the controller is further configured to:

allow the first expander to perform an expansion operation;

close the second expander;

control the expansion module to allow the refrigerant to flow to the third refrigerant line; and control the temperature adjustment door so that the conditioning air passes through the interior heat exchanger.

9. The integrated thermal management system of claim 2, wherein at a time of heating an interior and cooling the PE component, the controller is further configured to:

open the first expander;

close the second expander;

control the expansion module to expand the refrigerant while allowing the refrigerant to flow to the integrated heat exchanger;

operate the first water pump; and control the first valve so that the coolant flows to the integrated heat exchanger.

10. The integrated thermal management system of claim 2, wherein at a time of heating an interior and cooling the battery, the controller is further configured to:

open the first expander;

close the second expander;

control the expansion module to expand the refrigerant while allowing the refrigerant to flow to the integrated heat exchanger;

operate the second water pump; and control the second valve so that the coolant flows to the integrated heat exchanger.

11. The integrated thermal management system of claim 2, wherein:

at a time of:

absorbing heat from outside air during a process of heating an interior, cooling the PE component during the process of heating the interior, or cooling the battery during the process of heating the interior, the controller is further configured to:

allow the first expander to perform an expansion operation;

close the second expander; and control the expansion module so that the refrigerant flows to the integrated heat exchanger and is not expanded, when the time is the time of cooling the PE component, the controller is further configured to:

operate the first water pump; and control the first valve to allow the coolant to flow to the integrated heat exchanger, and when the time is the time of cooling the battery, the controller is further configured to:

operate the second water pump; and control the second valve to allow the coolant to flow to the integrated heat exchanger.

12. The integrated thermal management system of claim 2, wherein:

the second coolant line further comprises a coolant heater, and at a time of raising a temperature of the battery, the controller is further configured to:

control the expansion module to allow the refrigerant to flow to the third refrigerant line; and control and operate the second water pump and the coolant heater.

13. The integrated thermal management system of claim 2, wherein:

at a time of:

cooling the PE component during a process of heating and dehumidifying an interior, or cooling the battery during the process of heating and dehumidifying the interior, the controller is further configured to:

open the first expander;

allow the second expander to perform an expansion operation; and control the expansion module so that the refrigerant flows to the integrated heat exchanger and is expanded, when the time is the time of cooling the PE component, the controller is further configured to:

operate the first water pump; and control the first valve to allow the coolant to flow to the integrated heat exchanger, and when the time is the time of cooling the battery, the controller is further configured to:

operate the second water pump; and control the second valve to allow the coolant to flow to the integrated heat exchanger.

14. The integrated thermal management system of claim 2, wherein, at a time of absorbing heat from outside air by the refrigerant during a process of heating and dehumidifying an interior, the controller is further configured to:

allow the first expander to perform an expansion operation;

open the second expander;

control the expansion module to block a flow of the refrigerant to the second refrigerant line; and control the temperature adjustment door so that the conditioning air passes through the interior heat exchanger.

15. The integrated thermal management system of claim 14, wherein:

at a time of:

cooling the PE component and absorbing the heat from the outside air by the refrigerant during the process of heating and dehumidifying the interior, or cooling the battery and absorbing the heat from the outside air by the refrigerant during the process of heating and dehumidifying the interior, the controller is further configured to control the expansion module so that the refrigerant flows to the integrated heat exchanger and the refrigerant is not expanded, when the time is the time of cooling the PE component, the controller is further configured to:

operate the first water pump; and control the first valve to allow the coolant to flow to the integrated heat exchanger, and when the time is the time of cooling the battery, the controller is further configured to:

operate the second water pump and control the second valve to allow the coolant to flow to the integrated heat exchanger.

* * * * *